US007242413B2

(12) United States Patent
Chu et al.

(10) Patent No.: US 7,242,413 B2
(45) Date of Patent: Jul. 10, 2007

(54) METHODS, SYSTEMS AND COMPUTER PROGRAM PRODUCTS FOR CONTROLLING TREE DIAGRAM GRAPHICAL USER INTERFACES AND/OR FOR PARTIALLY COLLAPSING TREE DIAGRAMS

(75) Inventors: Heng Chu, Chapel Hill, NC (US); Thomas Richard Haynes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 10/446,198

(22) Filed: May 27, 2003

(65) Prior Publication Data

US 2004/0239683 A1 Dec. 2, 2004

(51) Int. Cl.
*G09G 5/00* (2006.01)
*G06T 11/20* (2006.01)
*G06F 3/00* (2006.01)
*G06F 9/00* (2006.01)
*G06F 17/00* (2006.01)

(52) U.S. Cl. ............... 345/619; 345/440; 715/851; 715/764

(58) Field of Classification Search ......... 345/619, 345/853, 854, 855, 74.1, 77, 89, 101, 207, 345/690, 589–590, 440; 715/764, 851, 853, 715/854, 855
See application file for complete search history.

(56) References Cited

U.S. PATENT DOCUMENTS

| 4,613,946 | A | 9/1986 | Forman ............... 364/518 |
| 5,515,487 | A | 5/1996 | Beaudet et al. ......... 395/140 |
| 5,588,107 | A | 12/1996 | Bowden et al. ......... 395/344 |
| 5,644,740 | A | 7/1997 | Kiuchi ................. 395/357 |
| 5,784,059 | A | 7/1998 | Morimoto et al. ...... 345/353 |
| 5,812,135 | A | 9/1998 | Kotchey ............... 345/356 |
| 5,923,328 | A | 7/1999 | Griesmer .............. 345/357 |
| 5,950,168 | A | 9/1999 | Simborg et al. .......... 705/3 |
| 5,977,971 | A | 11/1999 | Guzak et al. ........... 345/340 |
| 6,108,698 | A | 8/2000 | Tenev et al. ........... 709/220 |
| 6,111,578 | A | 8/2000 | Tesler ................. 345/356 |
| 6,154,750 | A | 11/2000 | Roberge et al. ........ 707/104 |
| 6,271,846 | B1 * | 8/2001 | Martinez et al. ....... 715/854 |

(Continued)

OTHER PUBLICATIONS

Webpage article regarding TVM_Expand message, Nov. 18, 2002.
Webpage article regarding Classic Fuzzy Tree, Nov. 18, 2002.
Webpage article regarding Fuzzy Tree, Nov. 18, 2002.

*Primary Examiner*—Kee M. Tung
*Assistant Examiner*—Chante Harrison
(74) *Attorney, Agent, or Firm*—Martin McKinley; Myers Bigel Sibley & Sajovec

(57) ABSTRACT

Methods for selectively displaying portions of a hierarchical data set on an electronic display comprise the steps of displaying at least a portion of the hierarchical data set on an electronic display in a tree diagram format. Input may then be obtained from a user to identify one or more displayed nodes in the tree diagram that are to be hidden and/or one or more hidden nodes in the tree diagram that are to be displayed. Based on this input, at least one node in the tree diagram is partially collapsed and/or at least one node in the tree diagram may be partially expanded so as to display the hidden nodes identified by the user and so as to hide the displayed nodes identified by the user.

13 Claims, 21 Drawing Sheets

U.S. PATENT DOCUMENTS

| | | |
|---|---|---|
| 6,314,424 B1 | 11/2001 | Kaczmarski et al. .......... 707/10 |
| 6,380,957 B1* | 4/2002 | Banning ..................... 715/828 |
| 6,437,812 B1 | 8/2002 | Giles et al. ................. 345/853 |
| 2002/0154175 A1 | 10/2002 | Abello et al. ............... 345/853 |
| 2003/0174168 A1* | 9/2003 | van Leersum .............. 345/764 |
| 2003/0218641 A1* | 11/2003 | Longobardi ................. 715/853 |
| 2005/0114786 A1* | 5/2005 | Decombe .................... 715/764 |
| 2005/0120239 A1* | 6/2005 | Monroe et al. ............. 713/201 |
| 2005/0240881 A1* | 10/2005 | Rush et al. ................. 715/851 |

* cited by examiner

METHODS, SYSTEMS AND COMPUTER PROGRAM PRODUCTS FOR CONTROLLING TREE DIAGRAM GRAPHICAL USER INTERFACES AND/OR FOR PARTIALLY COLLAPSING TREE DIAGRAMS

FIELD OF THE INVENTION

The present invention relates generally to displaying hierarchical data on an electronic display or other display device. More particularly, the present invention relates to controlling the display of hierarchical data that is displayed on "tree diagram" graphical user interfaces.

BACKGROUND OF THE INVENTION

A wide variety of computer operating systems and computer application programs incorporate, display and/or perform operations on data or information which is hierarchical in nature. For example, most computer operating systems provide users access to a hierarchy of directories and/or sub-directories where documents, programs and/or other information are stored. Many computer e-mail systems likewise provide a hierarchy of files and/or sub-files in which e-mail messages may be stored. Organizer applications typically allow a user to establish task listings and/or store other forms of data which, once again, may be hierarchical in nature. The number and variety of computer systems and programs which store and/or manipulate hierarchical data sets continues to increase as computer processing applications continue to proliferate.

With the advent and expanded use of graphical user interfaces over the last fifteen or so years, it has become possible to display all or part of hierarchical data sets to the user of a computer via a "tree diagram" representation. Tree diagrams are particularly useful in displaying hierarchical data as the levels of the tree diagram visually depict the location of each piece of data in a way that quickly and intuitively conveys to a user both the location of the data within the hierarchy and the relationship of that data to other data in the hierarchy. Additionally, the hierarchical structure of a tree diagram may allow a user to more quickly and efficiently peruse the data, such as by reviewing the entries at the higher levels to locate particular branches which are most likely to contain the information of interest. A user also typically can "expand" or "collapse" the tree diagram at various points (i.e., displaying or hiding information in the higher levels of the tree) to further facilitate viewing the hierarchical data. Both custom programs, as well as tree diagram objects, are known in the prior art for providing a tree diagram graphical user interface to a user. For example, FIG. 3 is a screen capture of a prior art application (Microsoft Corporation's Windows Explorer) that includes a display area 5 containing hierarchical data displayed using a tree diagram graphical user interface.

While the use of tree viewer objects and custom tree viewer programs has expanded in recent years, so has the complexity of many of the hierarchical data sets that are displayed to the user via the tree diagram. Moreover, as computer memory and processing capabilities have expanded, users are now opening up more and more applications at the same time, resulting in desktop displays that typically have numerous windows open simultaneously in what may be a confusing, layered display of icons, windows and the like. Additionally hierarchical data is now displayed using tree diagrams on many mobile computing devices that have different constraints in terms of the size of the display and the control of windows. The complexity of the hierarchical data sets and the proliferation of environments in which they may be used have left a need for improved graphical user interfaces that display hierarchical data in tree diagram form.

SUMMARY OF THE INVENTION

Embodiments of the present invention provide for controlling tree diagram graphical user interfaces by selectively displaying portions of a hierarchical data set on an electronic display. At least a portion of the hierarchical data set may be displayed on the electronic display in a tree diagram format, and then input from a user may be obtained to identify one or more nodes in the tree diagram that are to be hidden. Based on this input, at least one node in the tree diagram is partially collapsed to hide the one or more identified nodes. Partially collapsing a node may be performed by collapsing at least one descendant node of the node at issue into the node without collapsing all the descendant nodes of the node at issue into the node. User input identifying one or more nodes in the tree diagram that are to be hidden may be obtained by having a user identify the nodes that will remain displayed when an ancestor node is partially collapsed.

Likewise, input from the user may be obtained to identify one or more currently hidden nodes in the tree diagram that are to be displayed. Based on this input, at least one node in the tree diagram may be partially expanded to display the identified nodes. Partially expanding a node may be performed by expanding the node to display a subset of its descendant nodes such as only some of its children nodes or selected nodes at various descendant node levels.

In further embodiments of the present invention, an indicia is provided on the electronic display that is associated with each partially collapsed node and that identifies the node as being a partially collapsed node. An ellipsis may be used as this indicia, and may be located between the partially collapsed node and the first descendant node of the partially collapsed node that is displayed on the electronic display. Additionally, user input may be obtained to identify one or more portions of the hierarchical data set that are not currently displayed in the tree diagram and then partially expanding at least one node in the tree diagram to display the one or more identified portions of the hierarchical data set.

A dialog box may also be associated with one or more nodes in the tree diagram. This dialog box may display at least some of a node's descendant nodes to facilitate obtaining input from a user identifying the nodes that are to be hidden when a partial collapse function is implemented. Similarly, the dialog box may alternatively (or additionally) display at least some of the nodes between the node at issue and the root node to facilitate obtaining the user input identifying nodes that are to be hidden when a partial collapse function is implemented.

In additional embodiments of the present invention, a hierarchical data set is selectively displayed on an electronic display by displaying a portion of the hierarchical data set on the electronic display in a tree diagram format and then obtaining user input to identify one or more hidden nodes in the tree diagram that are to be displayed. Based on this input, at least one node in the tree diagram may be partially expanded to display the one or more identified nodes.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
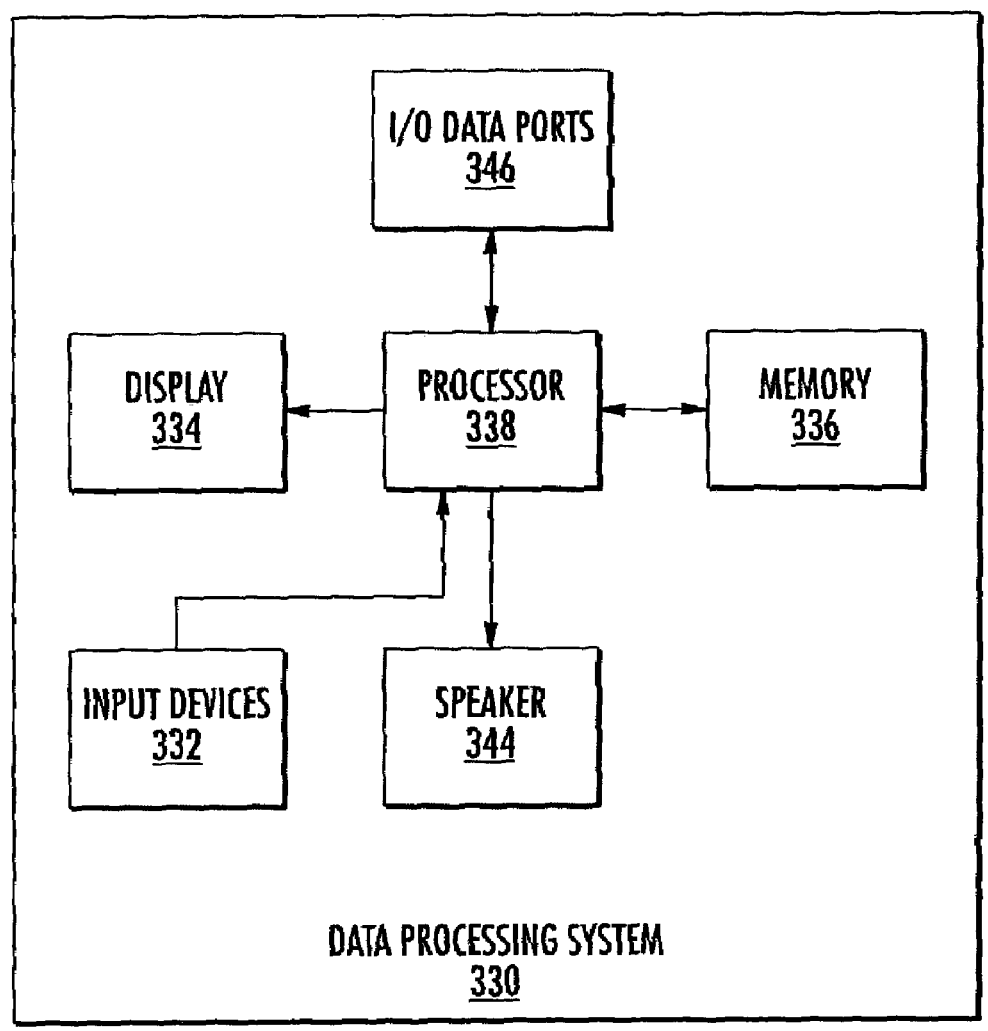
FIG. 1 is a block diagram of a data processing system suitable for use in embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for selectively displaying hierarchical data in tree diagram format on an electronic display. Many current computer applications require the manipulation and/or display of hierarchical data sets. To facilitate manipulation and navigation of such data sets, the hierarchical data is typically displayed to the user in tree diagram format on an electronic display.

Various embodiments of the present invention will now be described with reference to the figures. FIG. 1 illustrates an exemplary embodiment of a data processing system 330 suitable for a server and network traffic associated with the replicated server in accordance with embodiments of the present invention. The data processing system 330 typically includes input device(s) 332 such as a keyboard, pointer, mouse and/or keypad, a display 334, and a memory 336 that communicate with a processor 338. The data processing system 330 may further include a speaker 344, and an I/O data port(s) 346 that also communicate with the processor 338. The I/O data ports 346 can be used to transfer information between the data processing system 330 and another computer system or a network. These components may be conventional components, such as those used in many conventional data processing systems, which may be configured to operate as described herein.

Figure 2:
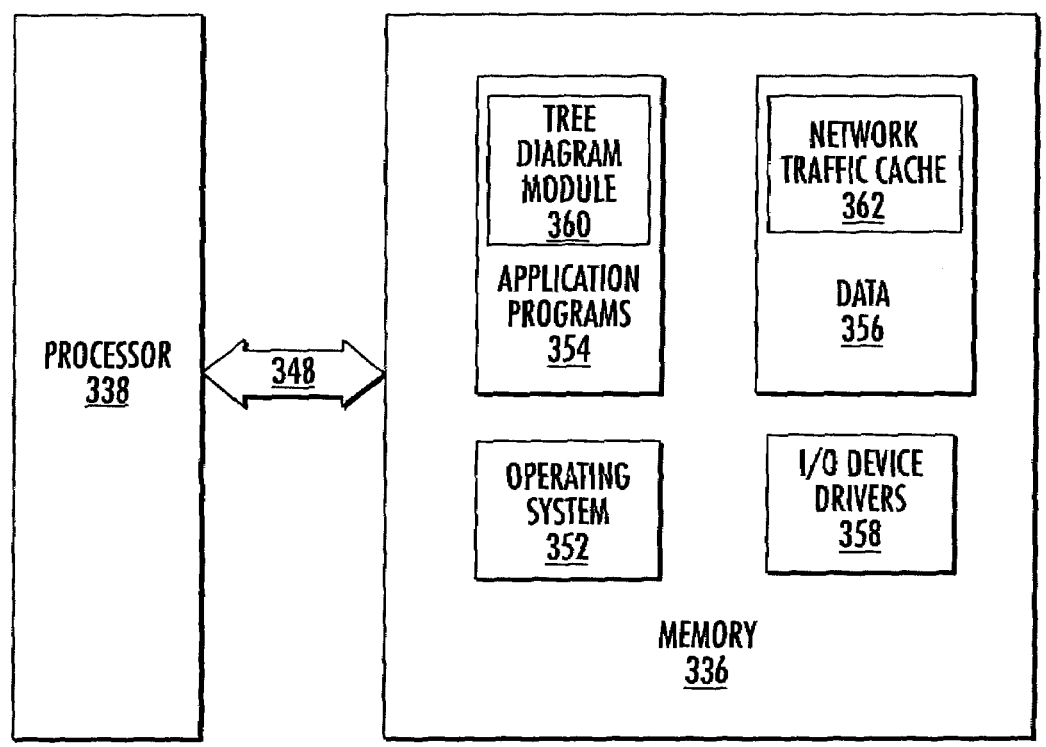
FIG. 2 is a more detailed block diagram of aspects of a data processing system that may be used in embodiments of the present invention.

FIG. 2 is a block diagram of data processing systems that illustrates systems, methods, and computer program products in accordance with embodiments of the present invention. The processor 338 communicates with the memory 336 via an address/data bus 348. The processor 338 can be any commercially available or custom microprocessor. The memory 336 is representative of the overall hierarchy of memory devices, and may contain the software and data used to implement the functionality of the data processing system 330. The memory 336 can include, but is not limited to, the following types of devices: cache, ROM, PROM, EPROM, EEPROM, flash memory, SRAM, and DRAM.

As shown in FIG. 2, the memory 336 may include several categories of software and data used in the data processing system 330: the operating system 352; the application programs 354; the input/output (I/O) device drivers 358; and the data 356, which may include hierarchical data sets. As will be appreciated by those of skill in the art, the operating system 352 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 358 typically include software routines accessed through the operating system 352 by the application programs 354 to communicate with devices such as the I/O data port(s) 346 and certain memory 336 components. The application programs 354 are illustrative of the programs that implement the various features of the data processing system 330 and preferably include at least one application which supports operations according to embodiments of the present invention. Finally, the data 356 represents the static and dynamic data used by the application programs 354, the operating system 352, the I/O device drivers 358, and other software programs that may reside in the memory 336.

As is further seen in FIG. 2, the application programs 354 may include a tree diagram module 360. The tree diagram module 360 may carry out the operations described herein for selectively controlling the display of a hierarchical data set in a tree diagram representation. While the present invention is illustrated, for example, with reference to the tree diagram module 360 being an application program in FIG. 2, as will be appreciated by those of skill in the art, other configurations may also be utilized while still benefiting from the teachings of the present invention. For example, the tree diagram module 360 may also be incorporated into the operating system 352, the I/O device drivers 358 or other such logical division of the data processing system 330. Thus, the present invention should not be construed as limited to the con figuration of FIG. 2 but is intended to encompass any configuration capable of carrying out the operations described herein.

Figure 4:
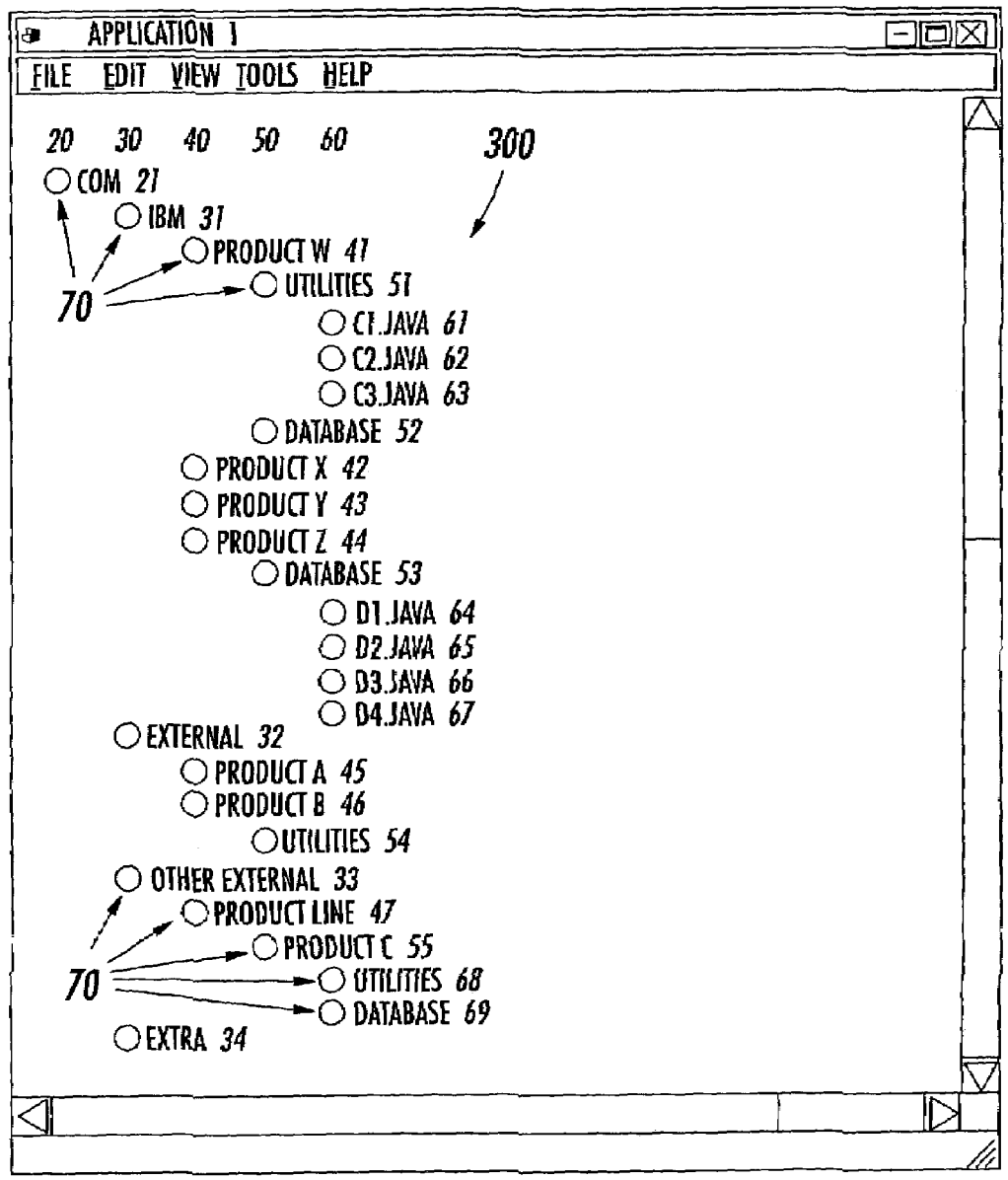
FIG. 4 depicts a display device on which a tree diagram is displayed.

As will be appreciated by those of skill in the art, a tree diagram refers to a display of data in which the data is arranged in a series of levels. FIG. 4 depicts an exemplary tree diagram 300 in which the data displayed in the tree diagram is arranged in a series of levels 20, 30, 40, 50, 60, which are physically offset from each other along the horizontal axis. The various entries 21, 31–34, 41–47, 51–55, 61–69 that comprise each level 20, 30, 40, 50, 60 are referred to herein as "nodes" in the tree diagram. Each such node typically contains data from the set of hierarchical data, such as for example, the data "com" that is displayed at node 21. The nodes are arranged in the tree diagram 300 to graphically display their hierarchical relationship with other nodes in the tree diagram 300. As shown in FIG. 4, the nodes may also include other information, such as, for example, the icons 70 (not all icons are numbered) that provide information regarding the amount of information from the hierarchical data set that is currently displayed in the tree diagram 300.

In the tree diagram 300 of FIG. 4, level 20 is the lowest level of the tree diagram, and level 60 is the highest level. Typically the lowest level is referred to as the "root" of the tree diagram or the "root level." The root level of a tree diagram typically, but not necessarily, includes only a single node. In FIG. 4, the root node is positioned on the left-most side of the tree diagram, although other orientations may be used. As shown in FIG. 4, the nodes in higher levels 30, 40, 50, 60 branch out from the node (or in some cases, nodes) at root level 20, which is why these diagrams are referred to as "tree" diagrams.

The nodes in a tree diagram may be "leaf" nodes or "non-leaf" nodes. A leaf node refers to a node that has no other nodes branching out from it. In FIG. 4, nodes 61–63, 52, 42, 43, 64–67, 45, 54, 68–69 and 34 are leaf nodes. Conversely, non-leaf nodes refer to any nodes (including the root node or nodes) which has additional nodes branching out from it. All the nodes in FIG. 4 that are not leaf nodes are non-leaf nodes. In a tree diagram, where a node branches out from a node at the next lower level, the node at the lower level is referred to as the "parent" node and the node at the higher level is referred to as the "child" node. By way of example, in FIG. 4 node 31 would be the parent of node 41 and node 41 would be the child of node 31. In situations where more than one node branch out from a parent node, the nodes at the higher level are collectively referred to as the "children" nodes of the parent node. Thus, in FIG. 4 nodes 61–63 comprise the children nodes of node 51. Similarly, the nodes that branch out, either directly or indirectly, from a node at a lower level are collectively referred to as the "descendant" nodes of the node from which they branch out from. By way of example, in FIG. 4 nodes 47, 55 and 68–69 are the descendants of node 33. Likewise, a first node is referred to as an "ancestor" node of a second node if the second node branches out, either directly or indirectly, from the first node. Thus, for example, in FIG. 4 nodes 21, 33, 47 and 55 would all be ancestor nodes of node 69.

In many applications, the hierarchical data sets that are to be viewed and/or manipulated are very large. Consequently, the tree diagrams corresponding to these data sets may be very wide (i.e., they have many levels) and/or very deep (i.e., they have many nodes in one or more levels). When this occurs, the entire tree diagram may not fit on the user's electronic display, thus making it more difficult to view and manipulate the hierarchical data set. While tree diagram graphical user displays typically include scrolling mechanisms in the horizontal and/or vertical directions that allow a user access to the entire tree diagram, the user may be interested in portions of the tree diagram that are physically distant from each other such that time and effort may be wasted scrolling between the views that show the nodes that are of interest. This is particularly true given the recent proliferation of numerous handheld computing devices such as Personal Data Assistants ("PDA"), inventory tracking handheld computers, cell phones and the like which typically have physically small electronic displays.

Figure 3:
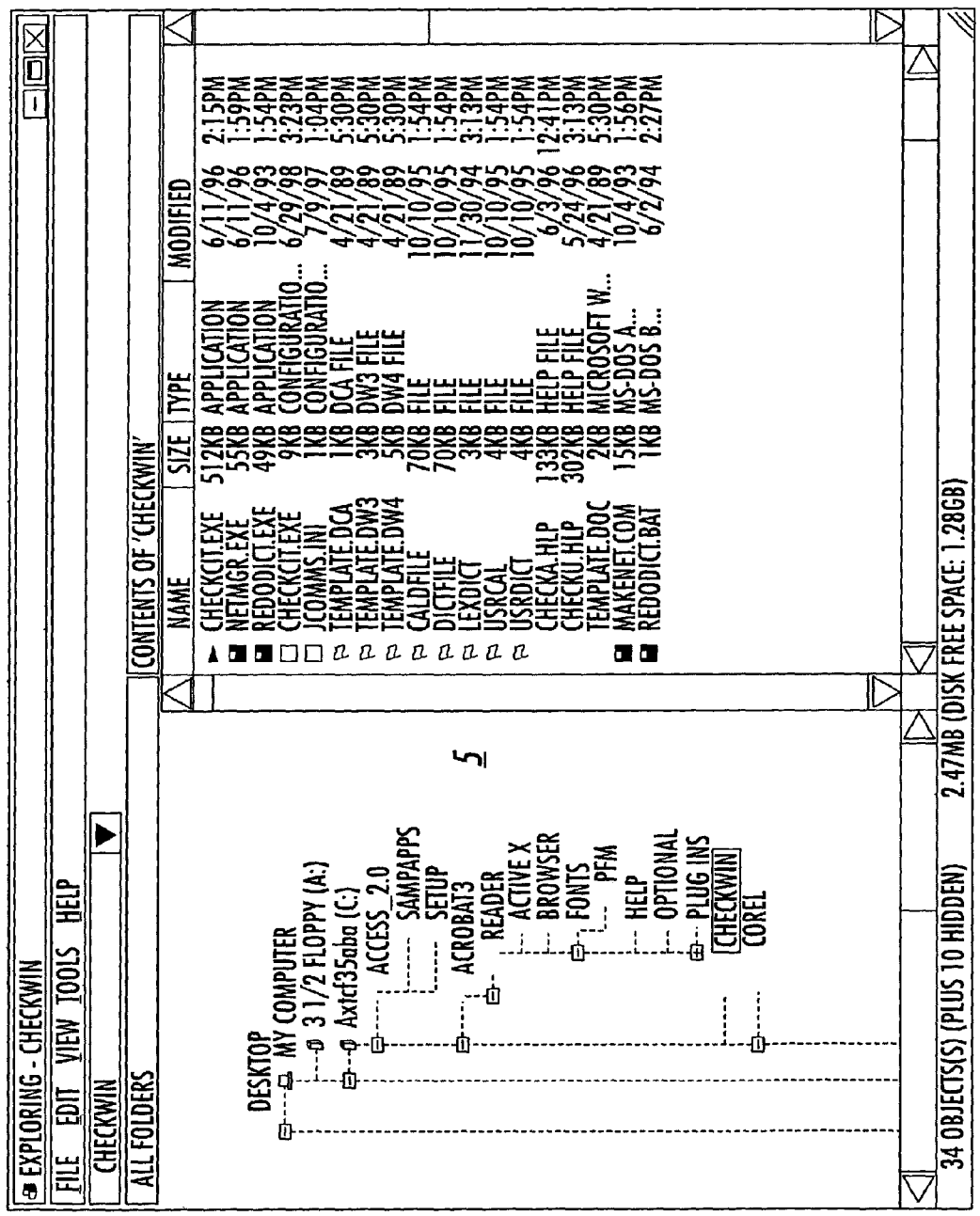
FIG. 3 is a screen capture of a conventional software program that provides a tree diagram graphical user interface.

Because of this problem, prior art tree diagram graphical user interfaces typically provide capabilities to "collapse" or "expand" nodes to vary the amount of information in the tree diagram that is actually displayed on the electronic display. By way of example, in the tree diagram of FIG. 3 a user may click on the box icons in display area 5 (the box icons each have a "+" sign or a "−" sign within the box) to "collapse" or "expand" the node with which each icon is associated. If a node is in a collapsed state, all the descendants of that node are hidden such that the node appears as a leaf node on the electronic display and a "+" sign appears in the box icon (see the node containing the data "Plug_ins" in FIG. 3). With respect to such a collapsed node, clicking on the "+" sign in the box icon will cause the node to expand by un-hiding (i.e., displaying) all the children nodes of that node. Conversely, a node may be in an expanded state such that at least of the children nodes of that node appear on the electronic display. When in such an expanded state, a "−" sign appears in the box icon (see, for example, the node containing the data "Access_2.0" in FIG. 3). With respect to such an expanded node, clicking on the "−" sign in the box icon will cause the node to collapse by hiding from view all the descendant nodes (not just the children nodes) of that node such that the node will be in a "fully collapsed" state. Such a fully collapsed node will appear as a leaf node on the electronic display as none of its descendant nodes are displayed. Thus, in these conventional tree diagram graphical user interfaces, a user may expand nodes one level at a time and fully collapse nodes to vary the amount of data from the tree diagram that actually appears in the electronic display. In some instances, functionality may also be provided that allows the user to "fully expand" a node (i.e., display all the descendant nodes of the node) with the click of a button.

Embodiments of the present invention provide an expanded set of controls for a tree diagram graphical user interface. In particular embodiments of the present invention, mechanisms for a user to partially collapse and/or partially expand a node such that a user defined subset of the descendant nodes that branch out from the node are displayed on the electronic display are provided. By "partially collapsing" a node it is meant that at least some, but not all, of the descendant nodes of the node at issue are hidden from view (i.e., they are not displayed on the electronic display). Likewise, "partially expanding" a node refers to expanding a node so that at least some, but not all, of the previously hidden descendant nodes of the node at issue are added to the display. The term "partially expanding" is not meant to encompass a full expansion of the node (i.e., when all the descendant nodes of the node are displayed) or a one level expansion of a node (i.e., when a node is expanded to display all the children nodes of the node but no other descendant nodes). A user can, by partially collapsing various nodes, hide the nodes in the tree diagram that are not of interest, while leaving the remaining nodes displayed. In this way, a user can reduce the number of nodes that are actually shown on the electronic display such that it is more likely that the entire non-hidden part of the tree diagram will fit within the display, thereby reducing or eliminating the need to scroll the display.

Figure 5:
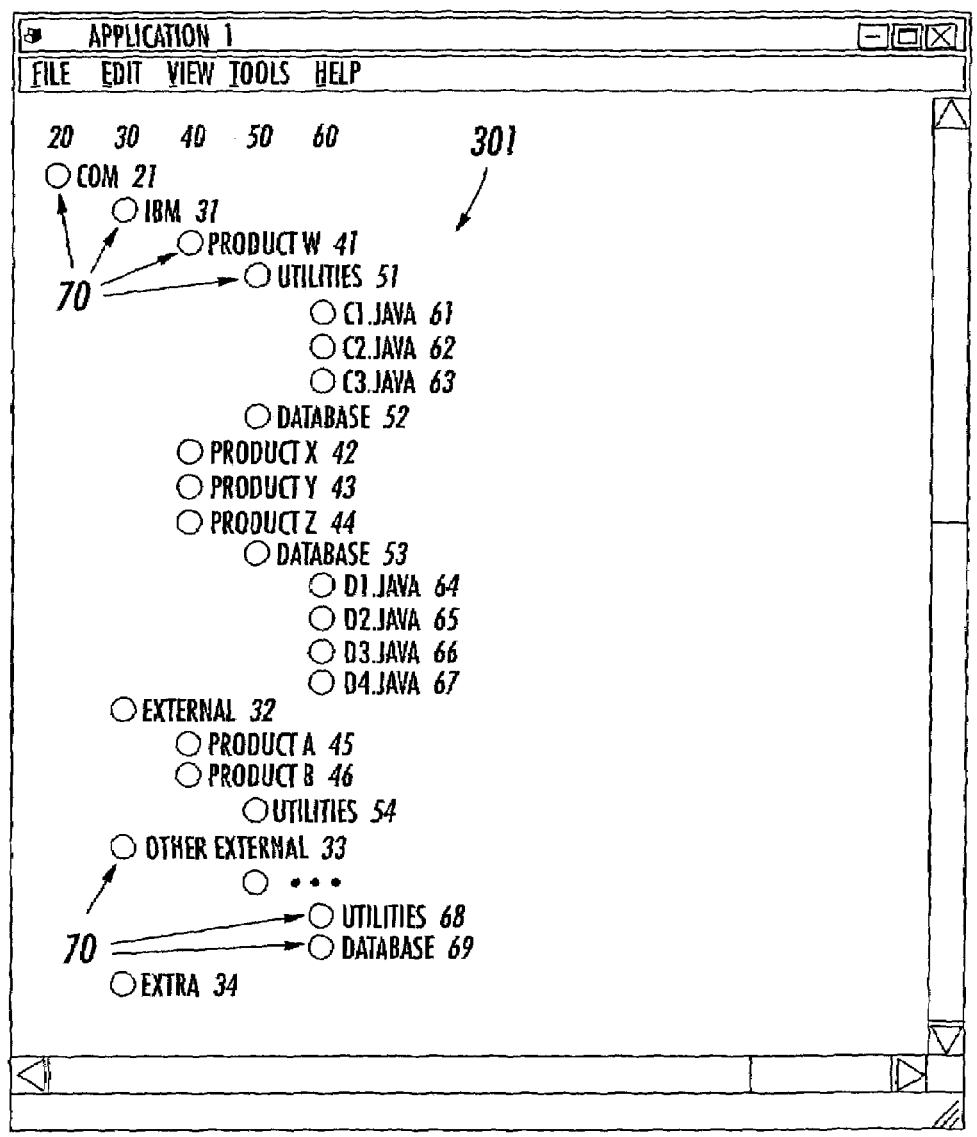
FIG. 5 depicts the display device and tree diagram of FIG. 4 modified to illustrate a partial collapse of one of the branches in the tree diagram.

In some embodiments of the present invention, a control for a tree diagram graphical user interface is provided that allows a user to partially collapse an expanded node in the tree diagram. Through this partial collapse capability, a user may identify a set of nodes along a branch of the tree diagram that are to be collapsed into a higher node so that they are no longer displayed on the electronic display. By way of example, in the tree diagram 300 of FIG. 4 a user might decide to partially collapse node 33 by hiding the nodes between node 33 and nodes 68–69. FIG. 5 shows how the tree diagram 300 of FIG. 4 would appear (as tree diagram 301) after such a partial collapse was performed. As is made clear from the description below, a user may also use this partial collapse capability to further collapse (or, in some embodiments, even expand) a partially collapsed node.

Figure 6A:
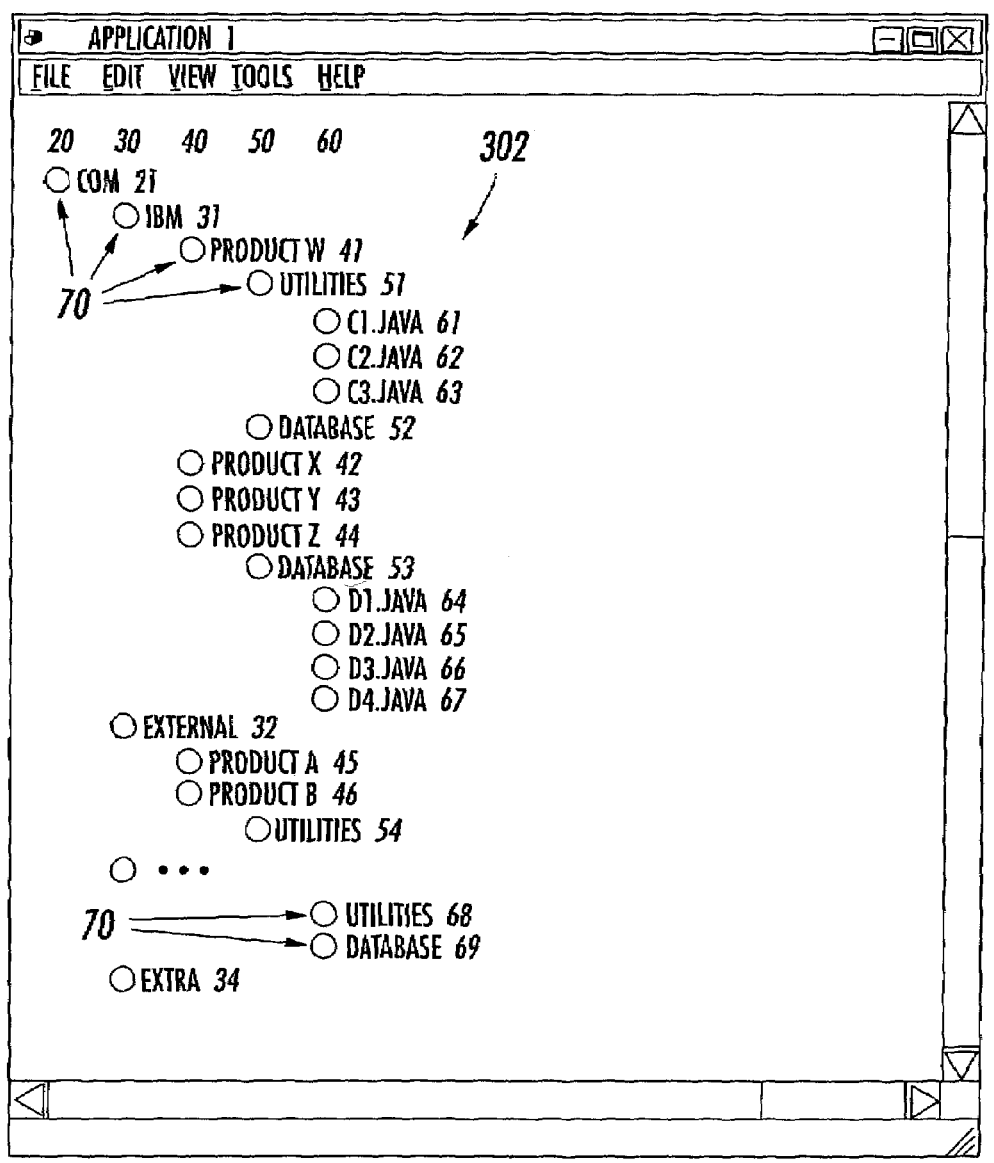
FIG. 6A depicts the display device and tree diagram of FIG. 4 after a Hide Intervening Nodes operation has been performed on the tree diagram.

In certain embodiments of the present invention, the partial collapse capability may be implemented as three separate operations that may be applied to a particular node of the tree diagram. The first of the three operations that may be used to implement the partial collapse capability is the Hide Intervening Nodes operation. Pursuant to this operation, the user may collapse the selected node and, if desired, one or more other nodes between the selected node and the root node 21, into a higher ancestor node. For example, in the tree diagram 300 of FIG. 4, the Hide Intervening Nodes operation could be used with respect to node 69 to hide a subset of the nodes between node 69 and root node 21, such as, for example, nodes 33, 47 and 55. FIG. 6A depicts a tree diagram 302 that shows how tree diagram 300 would look after the Hide Intervening Nodes operation was used.

Figure 6B:
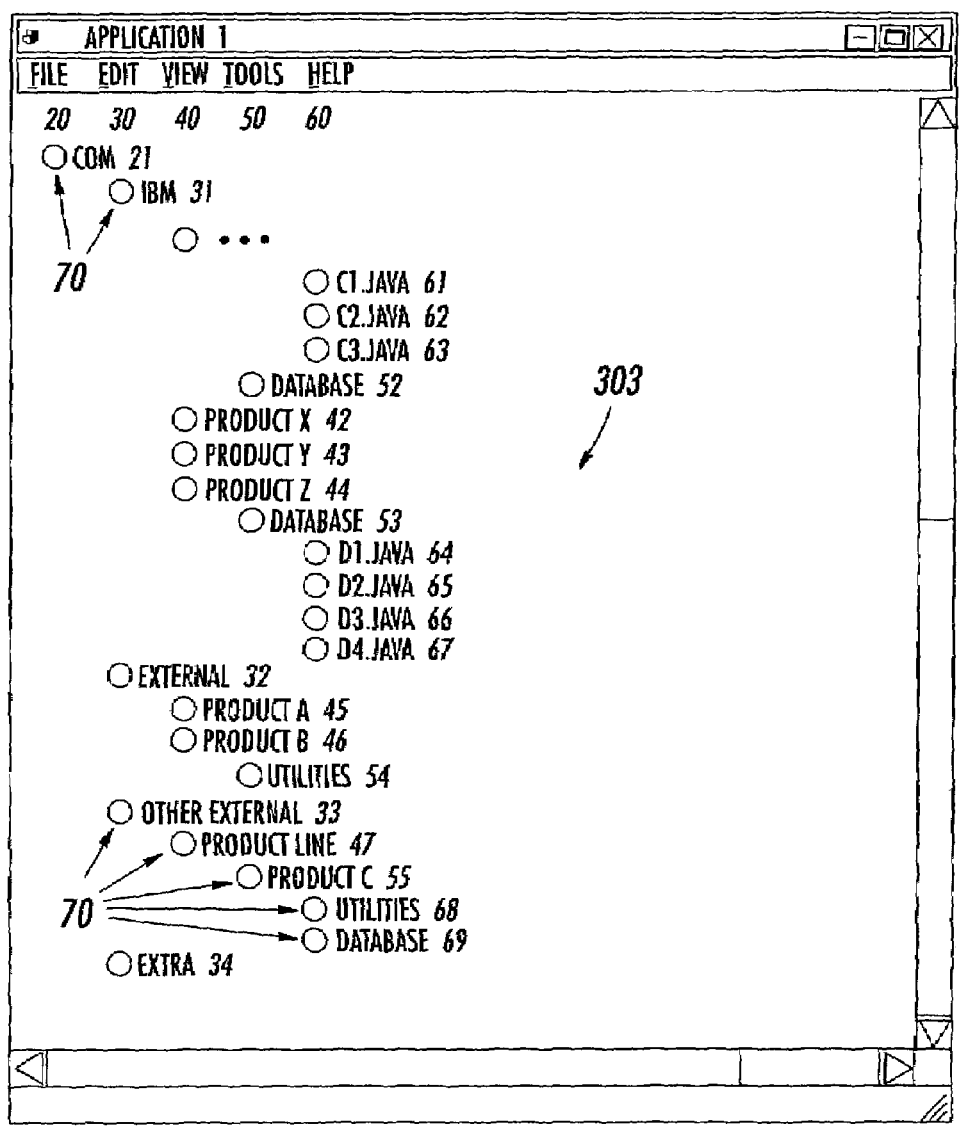
FIG. 6B depicts the display device and tree diagram of FIG. 4 after a Hide Contained Nodes operation has been performed on the tree diagram.

The second of the three operations is the Hide Contained Nodes operation. Pursuant to this operation the user may collapse selected of the descendant nodes of a first node into the first node. For example, in the tree diagram 300 of FIG. 4, the Hide Intervening Nodes operation could be used with respect to node 31 to hide a subset of the descendant nodes of node 31, such as, for example, nodes 41 and 51. FIG. 6B depicts a tree diagram 303 that shows how tree diagram 300 would look after the Hide Contained Nodes operation was implemented. The Hide Contained Nodes operation could also be used to completely collapse a node by selecting all of the descendants of the node as nodes to be hidden.

The final of the three operations is the Hide Me operation, which may be used to hide a selected node. This operation may be set up so that selection of the Hide Me operation would only hide a selected node, and/or so that it also hides some or all of the descendants of the selected node.

Figure 7A:
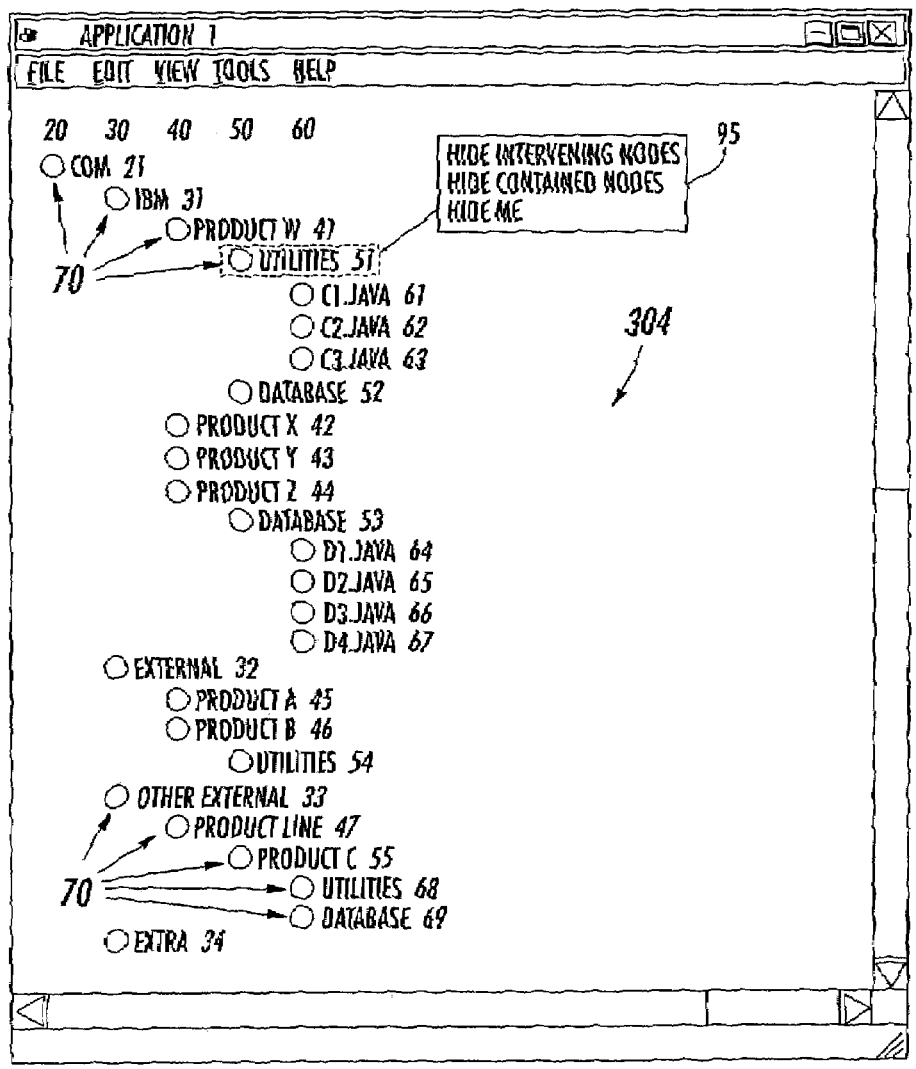
FIG. 7A depicts the display device and tree diagram of FIG. 4 after a user has pulled up a pop-up dialog box associated with one of the nodes in the tree diagram.
Figure 7B:
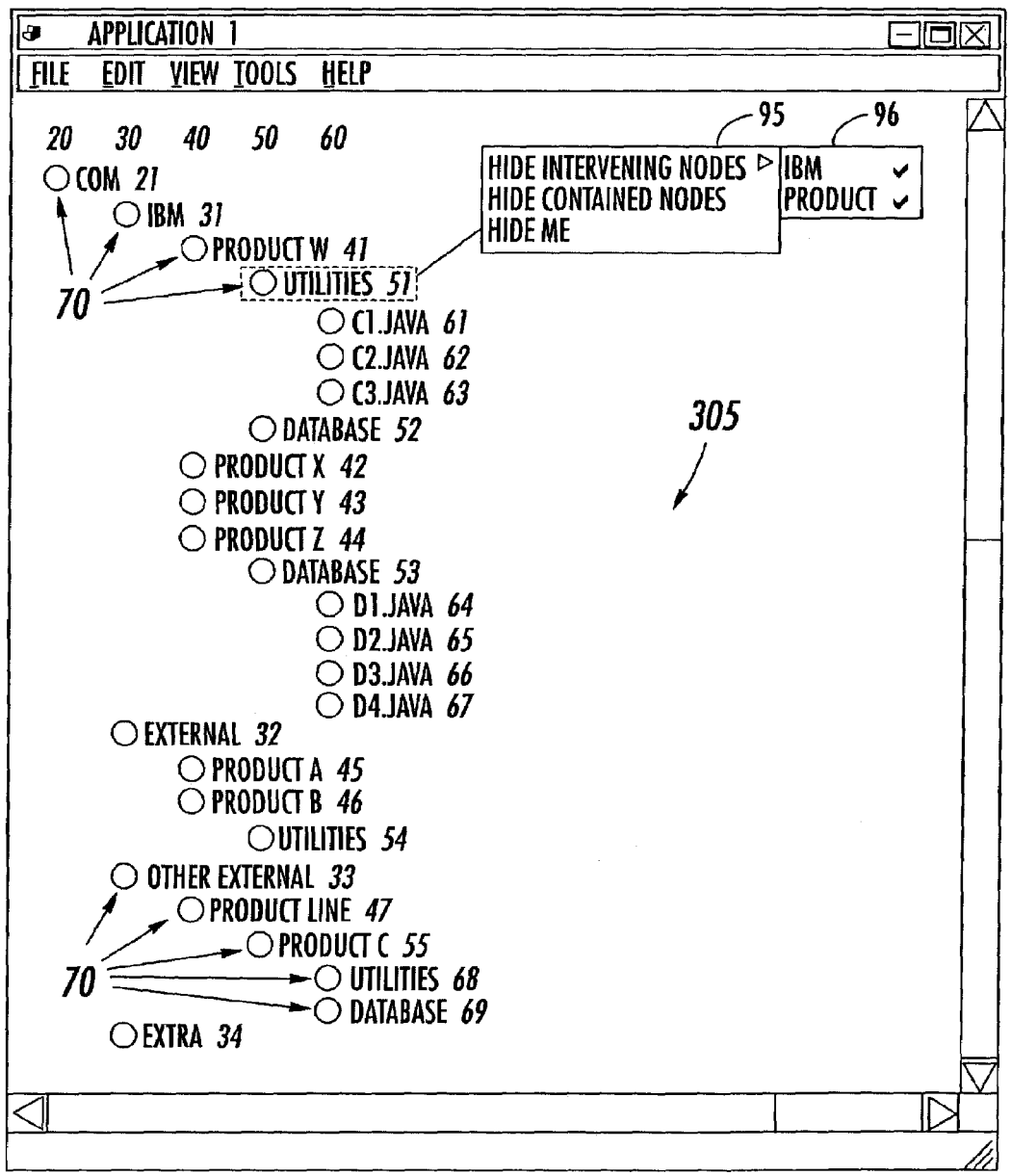
FIG. 7B depicts the display device and tree diagram of FIG. 7A after a user has pulled up a second pop-up dialog box associated with one of the nodes in the tree diagram.

FIGS. 7A and 7B depict operations according to particular embodiments of the present invention that may allow a user to partially collapse (or partially expand) a node in a tree diagram. As shown in FIG. 7A, a pop-up dialog box 95 may be provided on the electronic display to provide access to the "hide" operations. It will be understood that the term "dialog box" is used herein to refer to any textual, graphical or other message that appears on the display that allows the user to select from a range of choices. This pop-up dialog box 95 could be made to appear, for example, by using the "right click" button on a mouse or other pointer device or by allowing the pointer device to reside in the vicinity of a node for longer than a predetermined period of time. As illustrated in FIG. 7A, the pop-up dialog box 95 may display a representation of the three above-described operations, which the user may select between using a pointing device, such as a mouse. If the Hide Intervening Nodes or the Hide Contained Nodes operations are selected, an additional dialog box 96 may appear to allow the user to select the specific nodes that are to be hidden (see FIG. 7B).

Figure 8A:
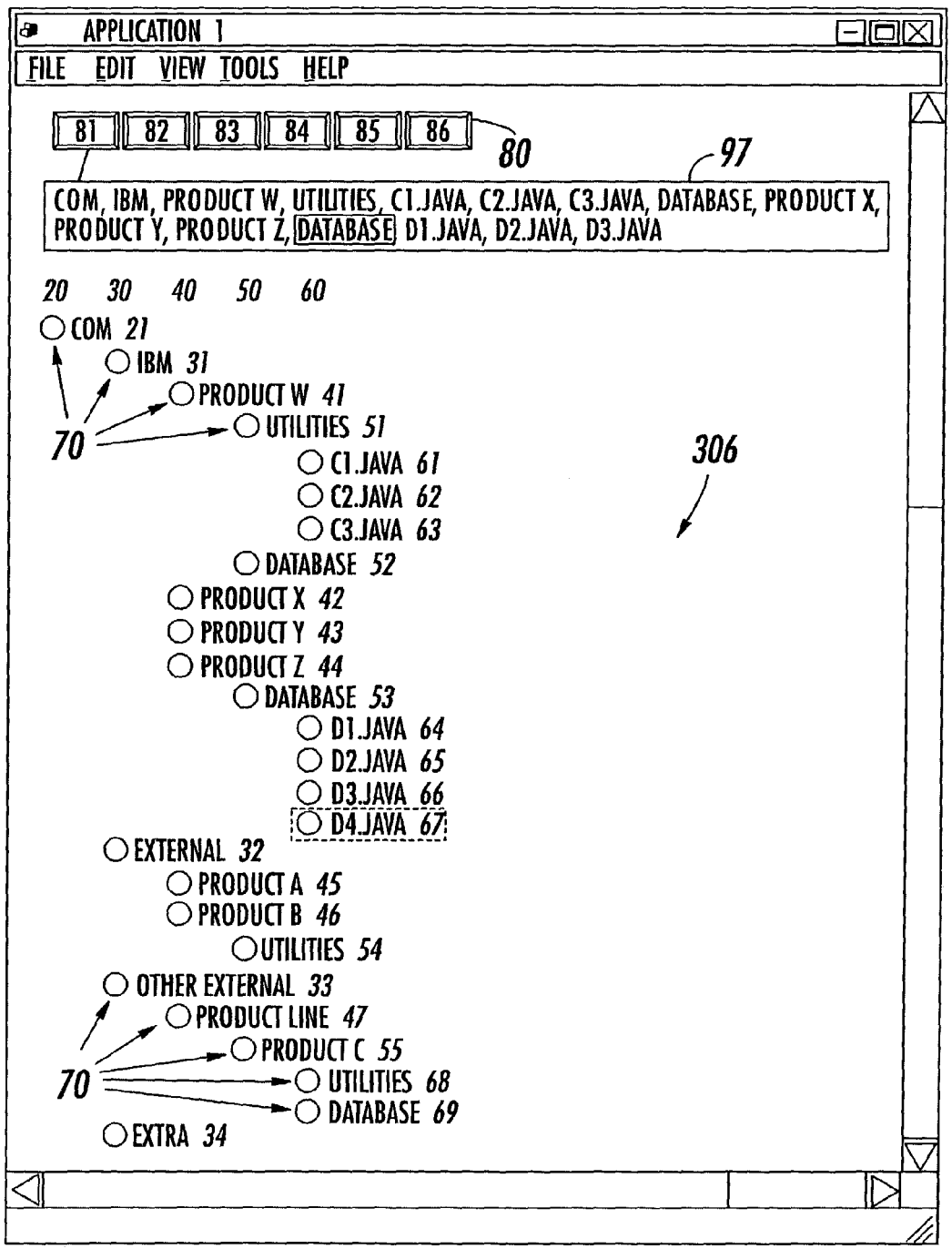
FIG. 8A depicts the display device and tree diagram of FIG. 4 where a tool bar is further displayed on the display device.
Figure 8B:
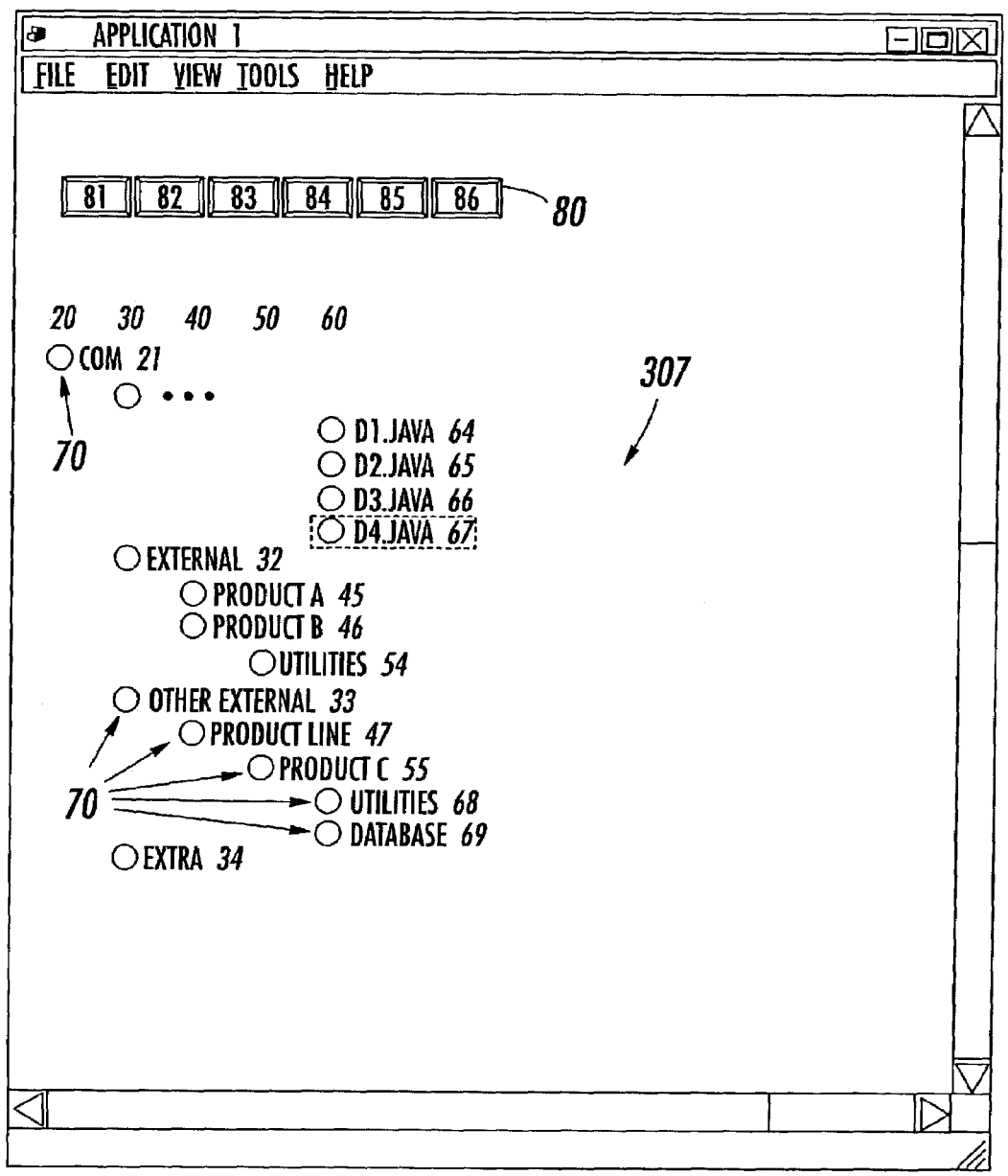
FIG. 8B depicts the display device and tree diagram of FIG. 8A after a partial collapse of the tree diagram has been performed using a Hide Intervening Nodes (String) operation.

As will be appreciated by those of skill in the art, the partial collapse capability and/or access to the "hide" operations may be implemented in a variety of different ways and thus, the present invention is not limited to the specific embodiments disclosed herein. FIGS. 8A and 8B provide another example as to how the partial collapse capability could be accessed. As shown in FIGS. 8A and 8B, a tool bar 80 may be provided on the electronic display. The tool bar 80 may include a plurality of user selectable buttons 81–85 that provide access to the collapse and expand operations. In the exemplary embodiment of FIGS. 8A through 8D, the first control button 81 selects the Hide Intervening Nodes (String) operation. As shown in FIG. 8A, when a node in the tree diagram is selected and this control button is also selected, a dialog box 97 appears that "displays" all the nodes between the selected node and the root node. (Note that the nodes can be displayed in the dialog box 97 in a variety of ways—the display method of FIG. 8A in which at least some of the data from each node is listed in the dialog box is one of numerous ways in which the node may be displayed). The user may then select (for example by using the left button on a mouse or other pointing device) the two endpoints of a string of intervening nodes (i.e., nodes between the selected node and the root node) that are to be hidden. The hide operation may be carried out immediately upon the selection of the second endpoint node.

In the example of FIG. 8A, the user has selected node 67 ("D4java") of a tree diagram 306 and activated the Hide Intervening Nodes (String) operation by pointing at control button 81 and left clicking the pointer device. This action caused a dialog box 97 to appear adjacent to tool bar 80 that lists each of the nodes between node 67 and the root of the tree (node 21). The user has already selected node 53 in this dialog box as first endpoint of the string of nodes that are to be hidden (as indicated by the box that appears around the data "database" associated with node 53). Once the user selects the second endpoint, which for exemplary purposes will be the data "ibm" associated with node 31, the tree diagram 306 will change to appear as the tree diagram 307 shown in FIG. 8B.

Figure 8C:
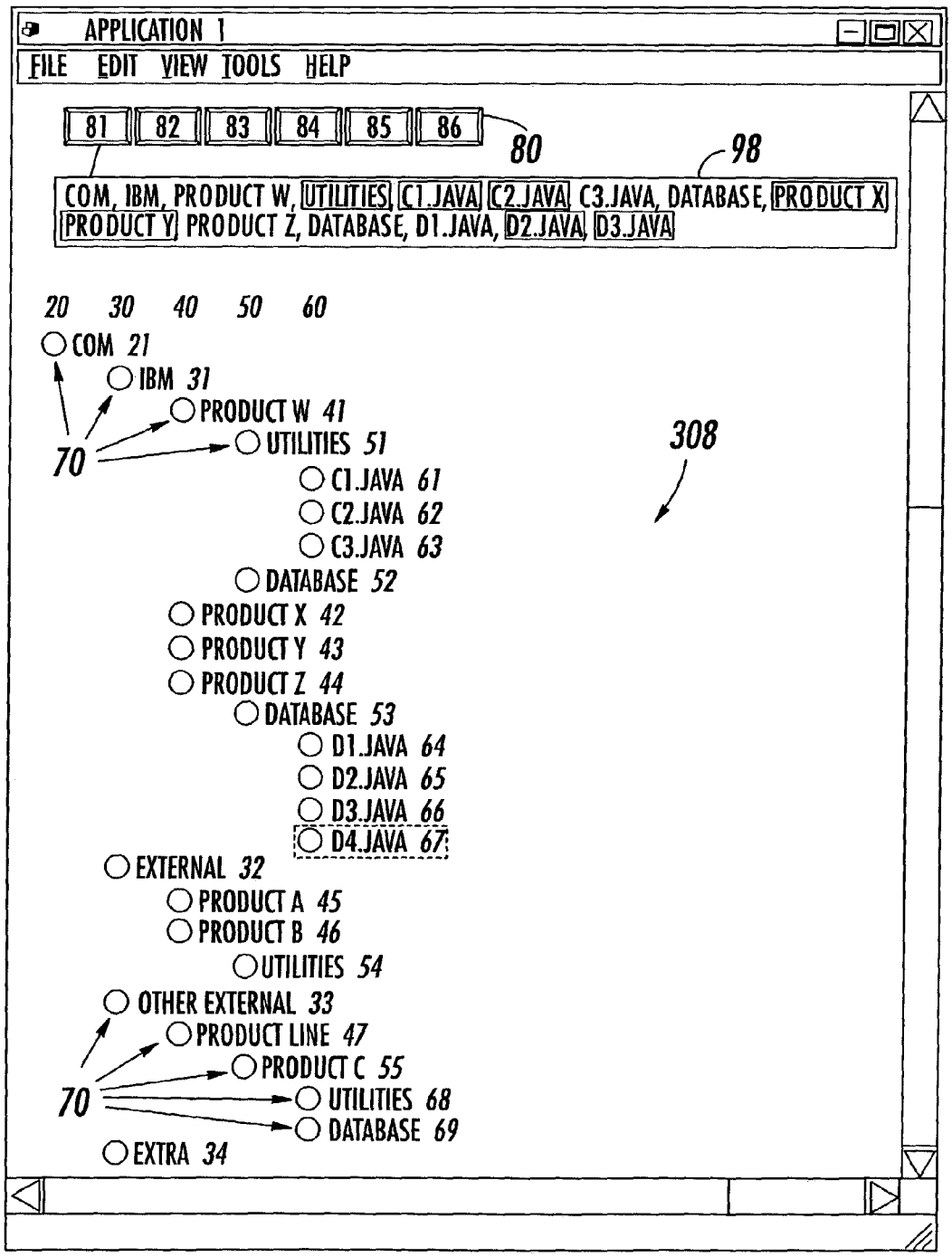
FIG. 8C depicts the display device and tree diagram of FIG. 4 where a tool bar is further displayed on the display device.
Figure 8D:
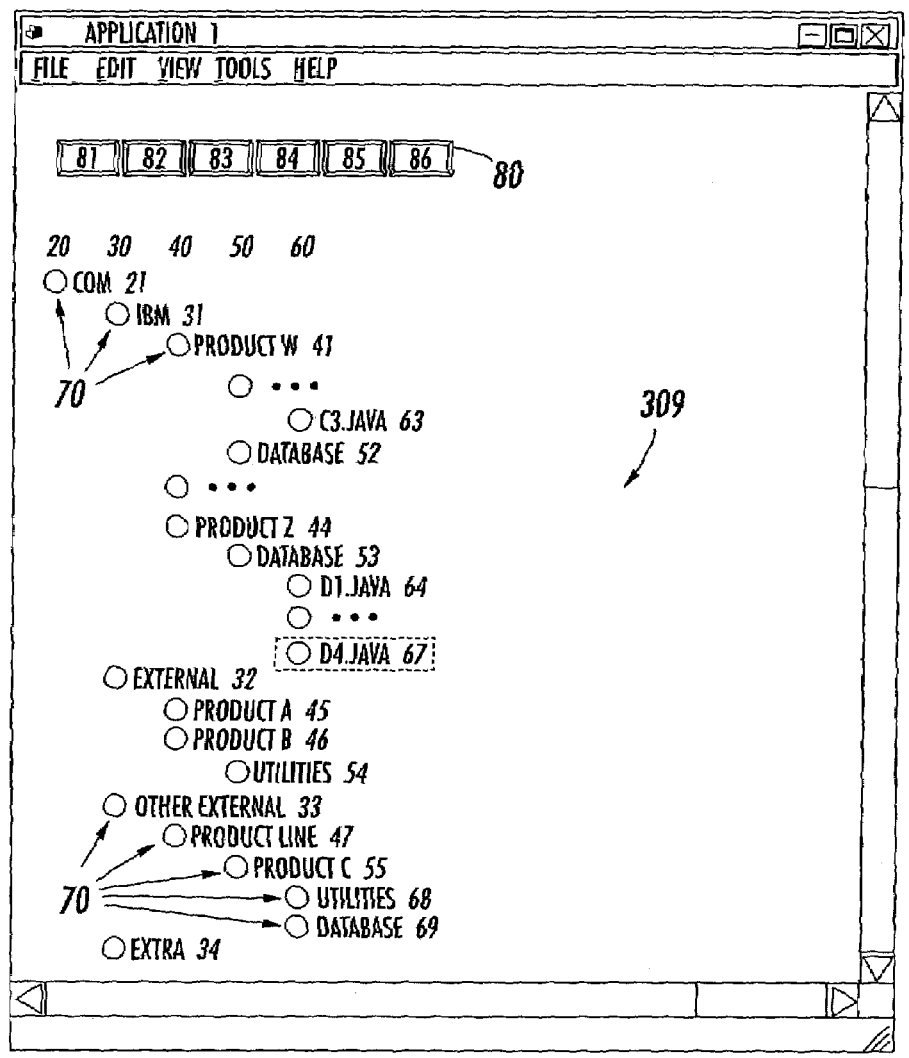
FIG. 8D depicts the display device and tree diagram of FIG. 8A after a partial collapse of the tree diagram has been performed using a Hide Intervening Nodes (Selected) operation.

FIGS. 8C and 8D illustrate how the Hide Intervening Nodes (Selected) operation may operate (control button 82). The Hide Intervening Nodes (Selected) Operation is similar to the Hide Intervening Nodes (String) operation described above, except here the user individually selects each node that is to be hidden instead of selecting the two endpoints of a string of nodes that are to be hidden. Thus, for example, in FIG. 8C, the user has selected the Hide Intervening Nodes (Selected) operation (control button 82) after selecting node 67 on the electronic display, and selected the data associated with nodes 51, 61–62, 42–43 and 65–66 in the resulting dialog box 98. As illustrated in FIG. 8D, the tree diagram 308 of FIG. 8C is modified to provide tree diagram 309 after the control operation is completed so that nodes 51, 61–62, 42–43 and 65–66 are hidden.

In the example of FIGS. 8A through 8D, control buttons 84, 85, 86 select the Hide Contained Nodes (String), Hide Contained Nodes (Selected), and Hide Me operations, respectively. The Hide Contained Nodes (String) and Hide Contained Nodes (Selected) operations operate in a manner similar to the Hide Intervening Nodes (String) and Hide Intervening Nodes (Selected) operations described above, except that the "contained node" operations are used to hide nodes that branch out from the selected node as opposed to nodes between the selected node and the root node.

The tree diagram graphical user interface embodiments of the present invention may also include the capability to partially expand a node. This capability is the converse of the partial collapse function in that it allows a user to select a subset of the descendants of a collapsed node and then only display the selected subset of nodes on the electronic display. Like the partial collapse capability, the partial expand feature may be implemented using dialog boxes, control buttons or any other input mechanism that allows the user to specify the nodes that are to be displayed (or hidden).

In particular embodiments of the present invention, the partial expand capability may be implemented as a set of three "unhide" operations that correspond to each of the three "hide" operations described above. Thus, an Unhide Intervening Nodes operation could be associated with nodes in the tree diagram that would allow the user to display any nodes between a selected node and the root node that were hidden using the Hide Intervening Nodes operation. Likewise, an Unhide Contained Nodes operation may allow the user to display any selected group of descendant nodes of a selected node. Finally, an Unhide Me operation may display a hidden node. Like the "hide" operations described above, the unhide operations may provide the capability to select the nodes either by designating the endpoints of a string of nodes and/or by individually selecting each node that is to be displayed.

Figure 9A:
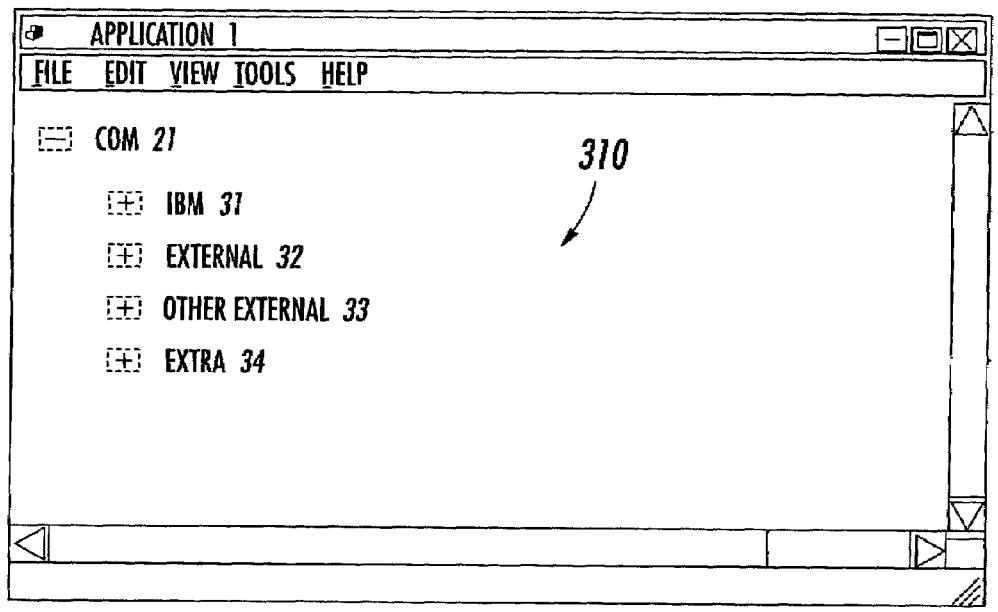
FIGS. 9A through 9C depict exemplary icons that may be used with the tree diagram graphical user interfaces of the present invention.
Figure 9B:
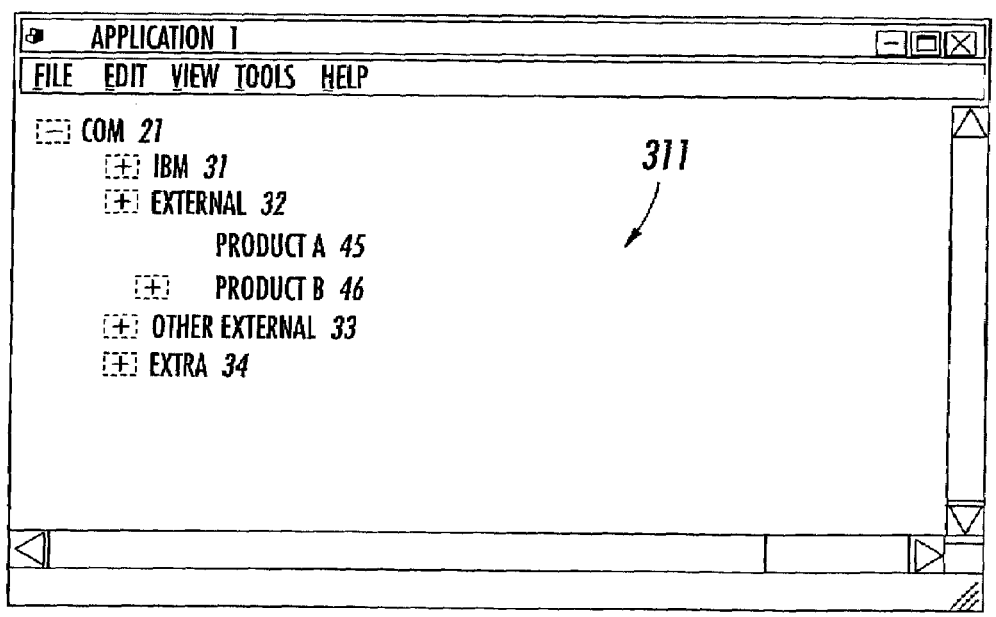
Figure 9C:
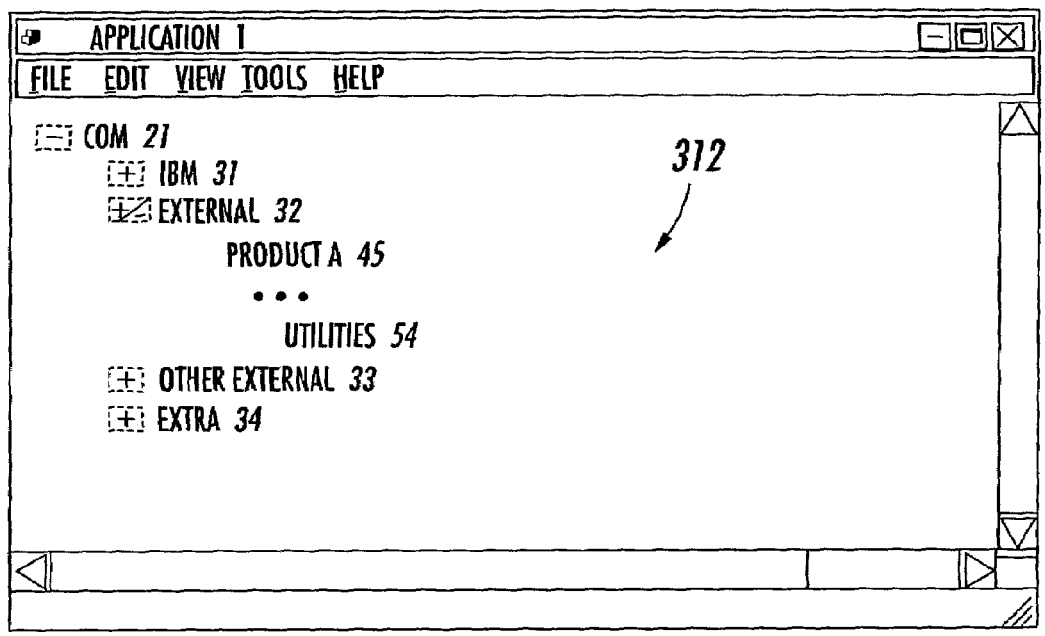

Icons may also be associated with various nodes in the tree diagram that indicate the collapsed/expanded state of the node. FIGS. 9A through 9C depict an exemplary set of icons that may be used to visually convey the collapsed/expanded state of a particular node in the tree diagram. As shown in FIGS. 9A through 9C, the indicia may comprise an icon that is located adjacent the data contained in each node of the tree diagram. As shown in FIG. 9A with respect to nodes 31–34, when the node is fully collapsed a "+" icon is associated with the node. As shown in FIG. 9B, when a node (for example, node 32) is expanded so that at least all the nodes in the next higher level are displayed, the "+" icon is replaced by a "−" icon. Finally, as shown in FIG. 9C, when a node is partially collapsed or partially expanded a "±" icon is used to designate the collapsed/expanded state of the node.

As will also be understood by those of skill in the art, the icon typically may be used to toggle between the different states. Thus, in the tree diagram 312 depicted in FIG. 9C the user could point to the − icon and click on it to close the subtree below node 32 (i.e., to revert to the tree diagram 310 of FIG. 9A). Likewise, selecting to the "+" icon next to node 32 in the tree diagram 310 of FIG. 9A will cause node 32 to expand one level such that node 45 and previously hidden node 46 will be displayed (see tree diagram 311 in FIG. 9B). With each successive click the icon will change to reflect the new state of the node.

Pursuant to the teachings of the present invention, one of several different actions may occur when a user clicks on a ± icon. In one embodiment, the user could use the pointing device to point to either the "+" or the "−" part of the icon to implement an expansion or a collapse of the node. In another embodiment of the invention, clicking on the ± icon will automatically implement either an expand or a collapse function (which is implemented may be set by the application or user controllable). In yet another embodiment, clicking on the ± icon (or alternatively, allowing the cursor to rest on the icon) will cause a secondary menu to appear that will allow the user to choose between at least two different expand and/or collapse functions.

It will be understood that indicia other than the indicia shown in FIGS. 9A through 9C may also be used. For instance, the color, shape or other characteristics of the data contained in a node could be changed depending upon the state of the node (e.g., partially collapsed, fully collapsed, etc.). Thus, it will be understood that embodiments of the present invention are not limited to the exemplary embodiments of possible indicia disclosed herein (or to their location with respect to the nodes), but covers all such indicia, and that the tree diagram graphical user interface need not include such indicia.

Additionally, an ellipsis (i.e., " . . . ") or some other indicia may be displayed on the electronic display to replace the nodes of a tree diagram that have been collapsed into an ancestor node. Such ellipses are shown, for example, in FIGS. 5, 6A, 6B, 8B, 8D and 9C. Pursuant to further embodiments of the present invention, a user may also perform an expand operation by selecting an ellipsis (via right clicking, for example) to make a context menu appear adjacent the ellipsis that may have, for example, operations functions such as a Show Immediate Children operation (that would display any hidden children of the node just below the ellipsis) or a Show All Hidden Nodes operation (that would remove the ellipsis and display previously hidden nodes in that section of the tree diagram).

In further embodiments of the present invention, descendant nodes for a non-leaf node may be manually designated or otherwise marked as "hot" nodes. Additional controls may then be provided that facilitate configuring the electronic display to show the partial subset of nodes marked as "hot" nodes. For instance, controls may be provided through which a user may expand a partially or fully collapsed tree diagram so that all the nodes that are marked as "hot" nodes are shown on the display. Controls may likewise be provided that partially collapse a fully or partially expanded tree diagram so that nodes that are not marked as "hot" nodes are hidden, but the "hot" nodes remain on the display. Controls could also be provided that that would partially expand a node by showing only those children nodes of the node that have been marked as "hot" nodes. A variety of additional controls could be provided for expanding or collapsing a tree diagram that has "hot" nodes in addition to the exemplary functions described herein.

Figure 10A:
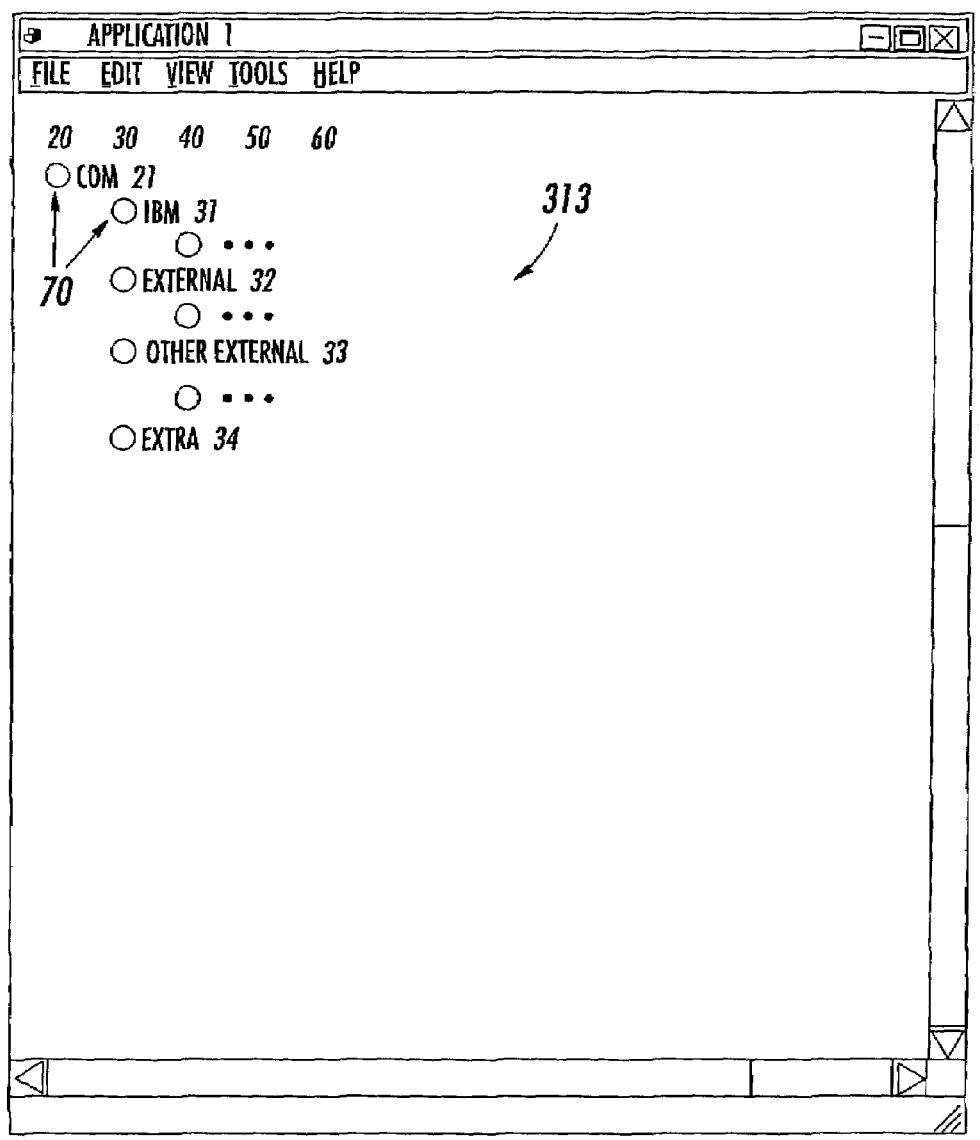
FIGS. 10A through 10D illustrate several "hot" expand and collapse operations that may be performed using the tree diagram graphical user interfaces of the present invention.
Figure 10B:
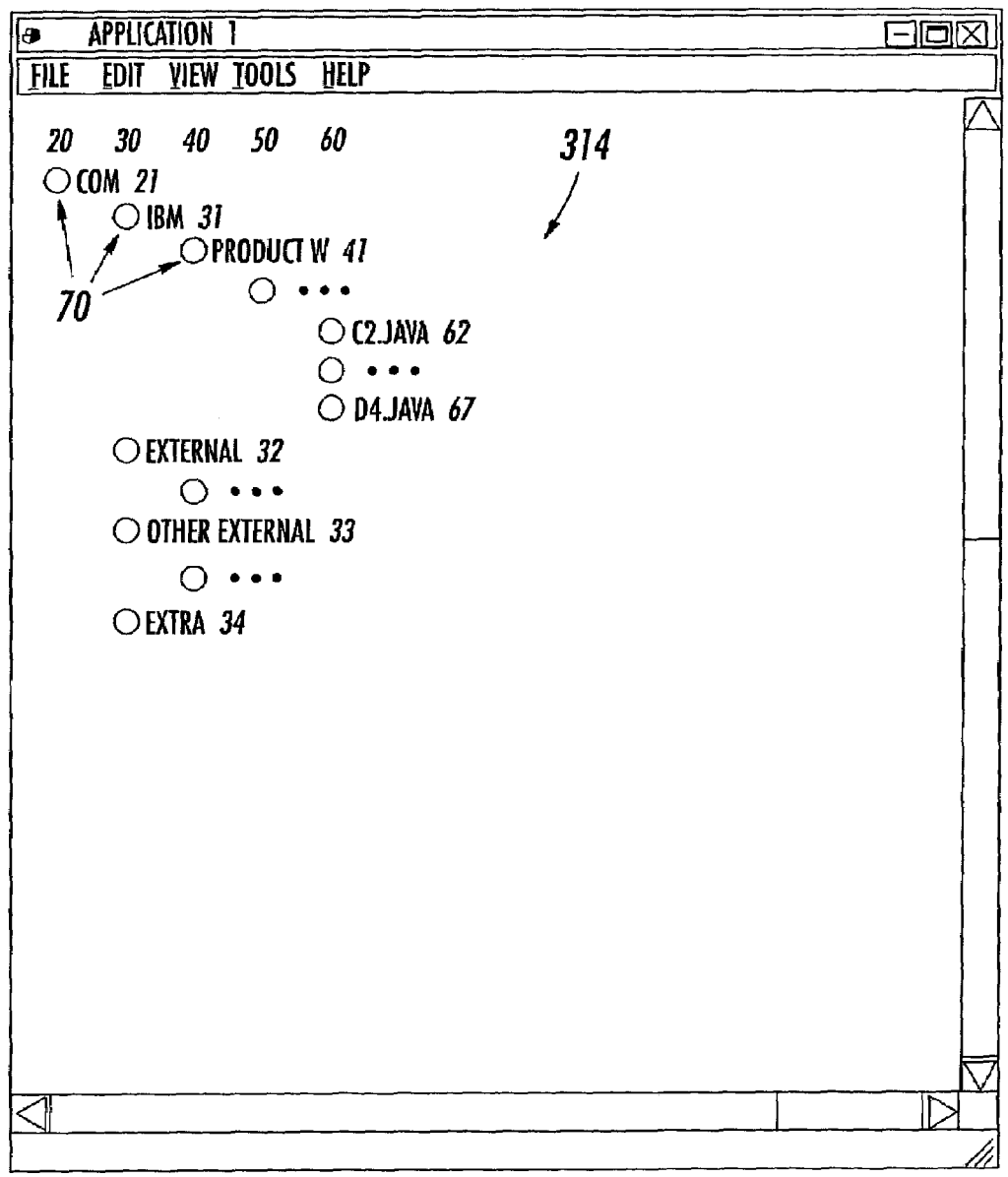
Figure 10C:
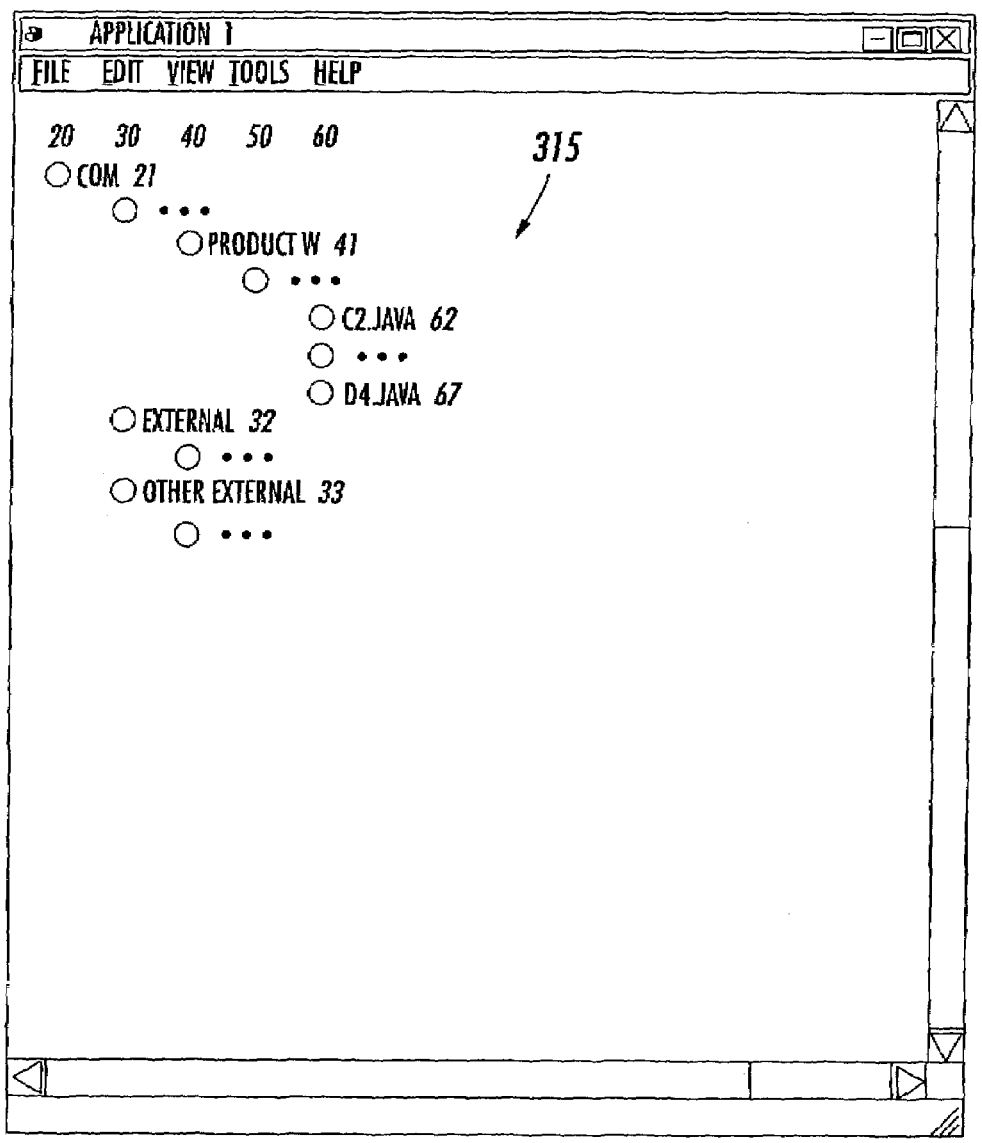

FIGS. 10A through 10C illustrate several possible "hot" expand and collapse operations that may be used in navigating tree diagrams in which nodes have been previously marked as "hot" nodes. FIG. 10A depicts a tree diagram 313 that corresponds to the tree diagram 300 of FIG. 4 in a partially collapsed state. In the example of FIGS. 10A through 10C, nodes 41, 62, 67 and 32–33 have been previously marked by the user as "hot" nodes. The tree diagram graphical user interface may include a tool bar (or any other means of accepting user input such as a pull-down menu) that has control buttons for performing "hot" expansions and collapses of the tree diagram. For example, a Hot Expand operation may be provided that allows a user to expand a partially or fully collapsed tree diagram to display all previously displayed nodes, along with all nodes that have been marked as "hot." FIG. 10B depicts a tree diagram 314 that shows what would happen if the Hot Expand function was implemented on the tree diagram 313 of FIG. 10A. As shown in FIG. 10B, all the previously displayed nodes would remain displayed, and nodes 41, 62 and 67 (all of which were marked as "hot" and previously were hidden) would also be added to the display. As shown in FIG. 10C, a Display Hot Nodes operation allows a user to display only those nodes of the tree diagram that have been marked as "hot" nodes. The root node(s) typically would also be displayed.

Figure 10D:
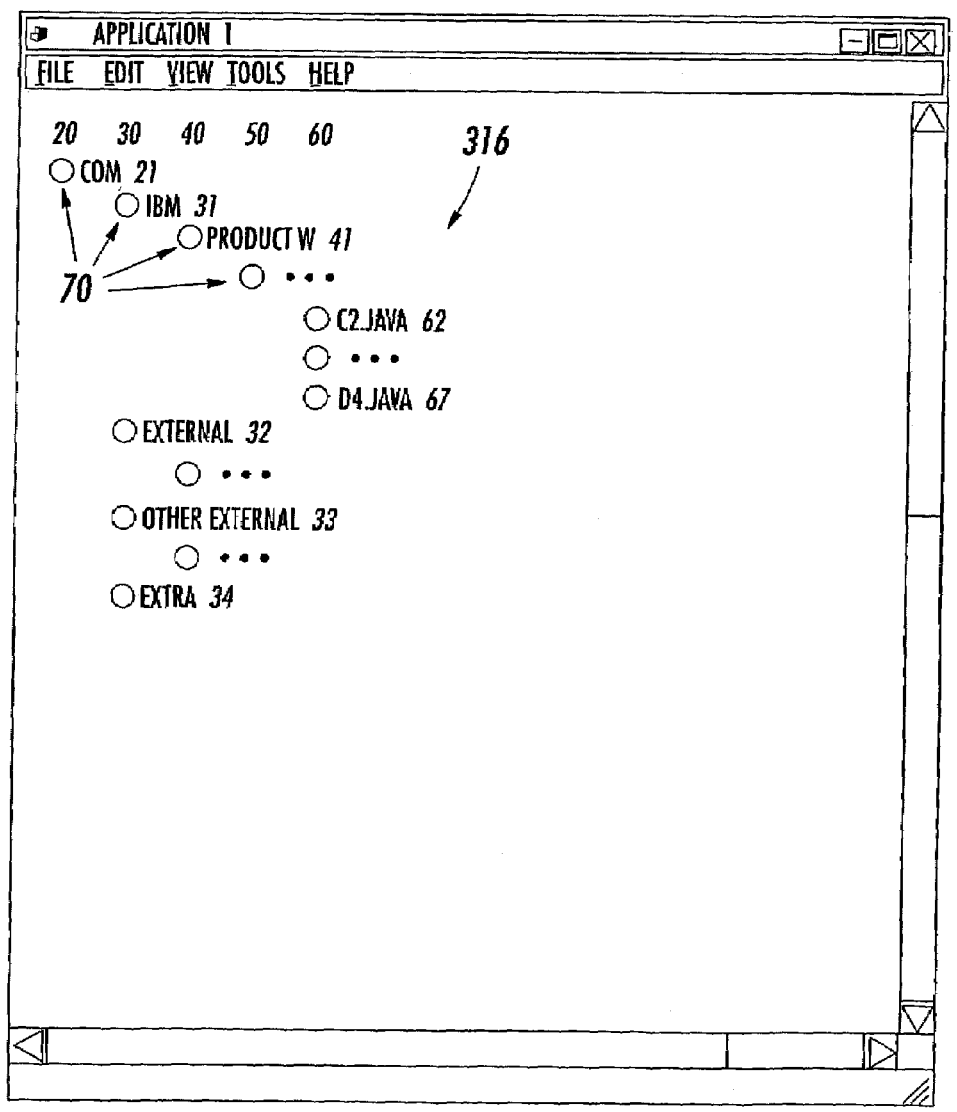

Controls for performing "hot" expansions and collapses may also be implemented with respect to specific nodes in the tree diagram 10. By way of example, FIG. 10D illustrates a tree diagram 316 showing what would happen when a Hot Expand operation was carried out with respect to node 31 on the tree diagram 313 of FIG. 10A. As shown in FIG. 10D, performing the Hot Expand operation with respect to node 31 causes nodes 41, 62 and 67 to appear on the tree diagram 316 as these are the descendant nodes of node 31 that had previously been marked as "hot" nodes. Similarly, a Hot Collapse operation may be carried out with respect to a particular node to hide all the descendants of the node that had not previously been marked as "hot" nodes. It will be appreciated that various other "hot" collapse and "hot" expand operations could also be provided, and the present invention should not be considered to be limited to the exemplary operations that are specifically discussed herein.

Capabilities may also be provided to automatically identify "hot" nodes based on a set of "filtering" rules. By way of example, the tree diagram graphical user interface might identify as a "hot" node any node in the tree diagram that the user has selected or operated on recently. Numerous other filtering rules could be used and/or provided, and the optimum rules will typically vary depending upon the hierarchical data set at issue. Typically, the filtering rules would be provided as part of the tree diagram graphical user interface, and could be applied automatically or, alternatively, the user could select from a menu of filtering rule choices. Such automatic filtering rules may reduce or eliminate the need for a user to manually mark nodes as "hot" nodes, and hence may simplify use of the tree diagram graphical user interface.

Pursuant to additional embodiments of the present invention, capabilities may be provided to save the configuration of nodes in the tree diagram that are displayed on the electronic display. Through this save feature, a user may save a desired configuration of the tree diagram that appears on the display so that this configuration may be made to appear on demand and/or to automatically appear when the tree diagram graphical user interface is opened. In one embodiment, the graphical user interface saves the configuration of the tree diagram that appears on the display each time the graphical user interface application is terminated. This configuration may then automatically appear on the display the next time the graphical user interface is opened. A user selectable control may also be provided that allows the user to display the saved configuration. In another embodiment of the invention, the user may save a particular configuration that appears on the display at any time, and may have the option to make any of a variety of saved configurations appear on the display.

The tree user graphical user interfaces of the present invention may be implemented as part of special purpose applications, as object-oriented programs, or in any of a variety of different ways known to persons of skill in the art.

Figure 11:
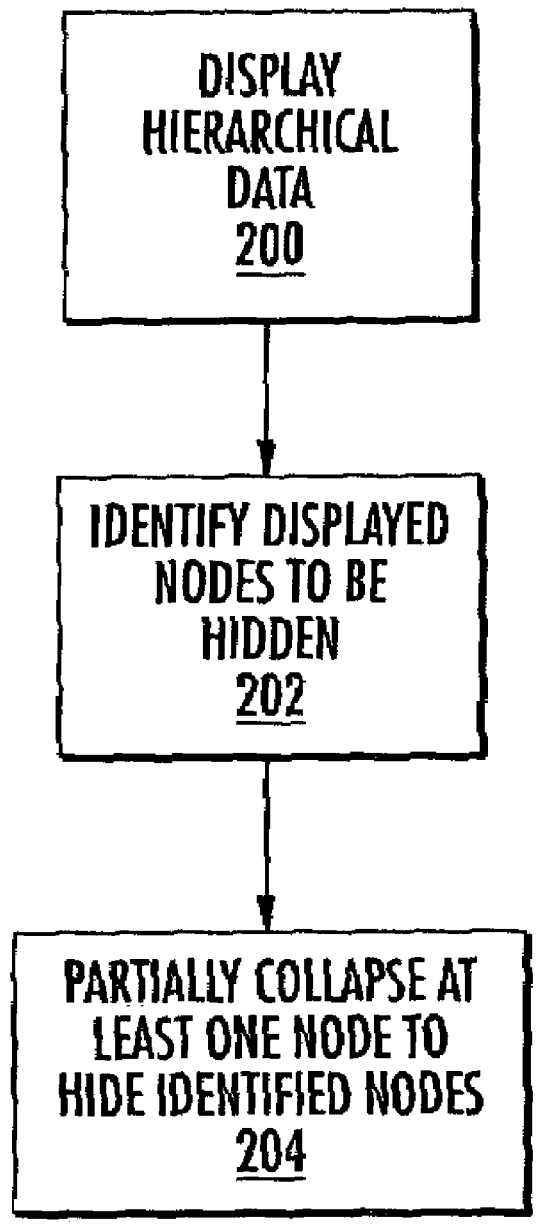
FIG. 11 is a flowchart of one embodiment of the present invention.
Figure 12:
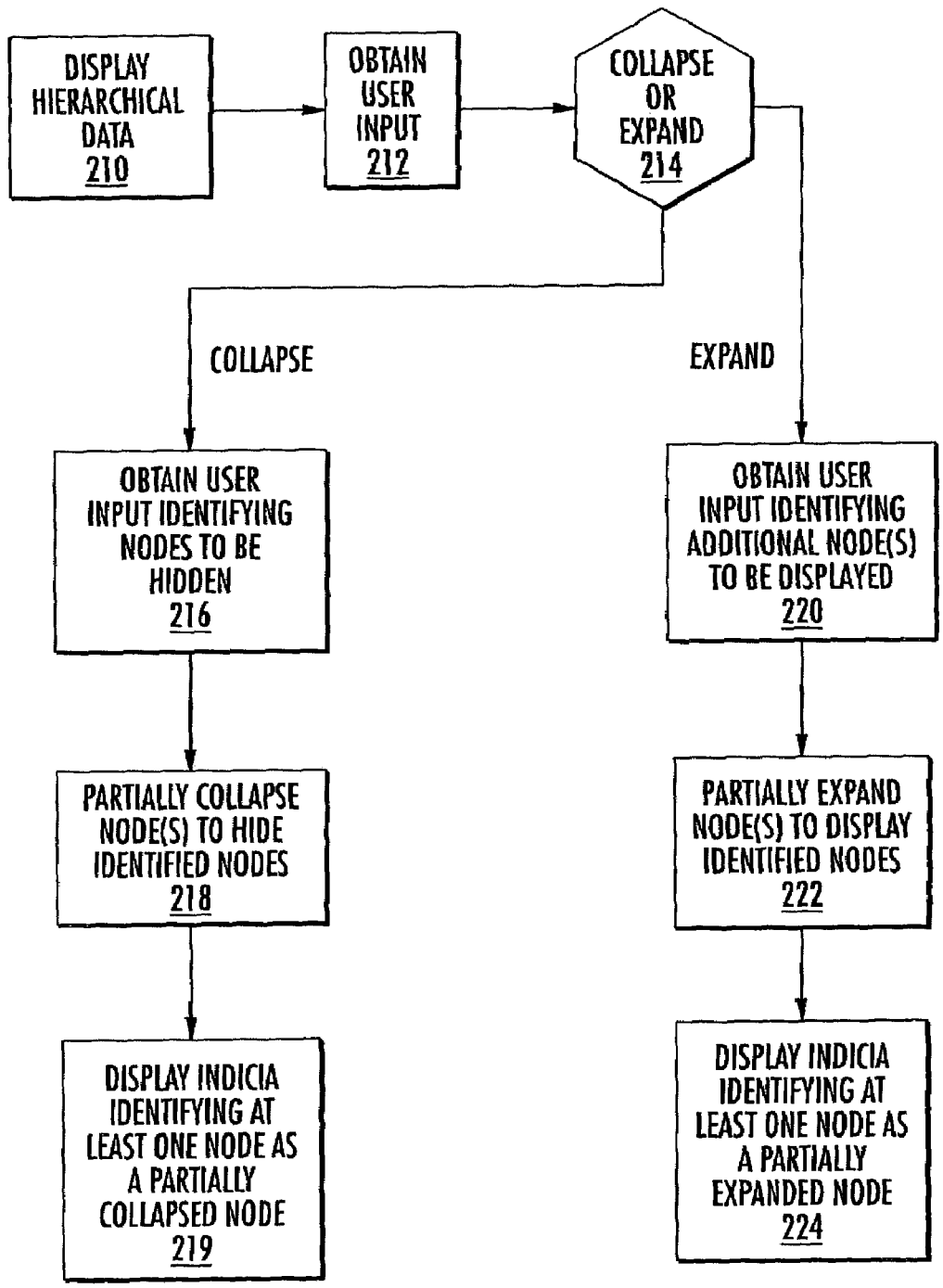
FIG. 12 is a flowchart of another embodiment of the present invention.

FIGS. 11 and 12 are flowchart illustrations that depict operations for displaying portions of a hierarchical data set on an electronic display pursuant to embodiments of the present invention. As shown in FIG. 11, in one such embodiment at least a portion of the hierarchical data set is first displayed on the electronic display in a tree diagram format (block 200). User input is obtained to identify one or more of the displayed nodes in the tree diagram that are to be hidden (block 202). Then at least one node in the tree diagram is partially collapsed to hide the one or more identified nodes (block 204).

As shown in FIG. 12, in another such embodiment at least a portion of the hierarchical data set is first displayed on the electronic display in a tree diagram format (block 210). User input is obtained regarding the operation to be performed (block 212), and a decision is made based on whether a collapse or expand operation is selected by the user (block 214). If a collapse operation is selected at block 214, user input is obtained identifying the nodes that are to be hidden by the collapse operation (block 216). At least one node on the tree diagram then is partially collapsed to hide the identified nodes (block 218). An indicia identifying that at least one node depicted on the electronic display is a partially collapsed may also be displayed (block 219). If an expand operation is selected at block 214, user input is obtained identifying the nodes that are to be displayed by the expand operation (block 220). At least one node on the tree diagram then is partially expanded to display at least some of the identified nodes (block 222). An indicia identifying that at least one node depicted on the electronic display is a partially expanded node may also be displayed (block 224).

The flowcharts and block diagrams of FIGS. 1, 2 and 11–12 illustrate the architecture, functionality, and operation of possible implementations of systems, methods and computer program products for selectively controlling tree diagram graphical user interfaces according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method for selectively displaying portions of a hierarchical data set on an electronic display, the method comprising:
    displaying at least a portion of the hierarchical data set on the electronic display in a tree diagram format;
    obtaining user input to identify one or more nodes in the tree diagram that are to be hidden; and
    partially collapsing at least one node in the tree diagram to hide the one or more identified nodes, wherein the partial collapse comprises collapsing the at least one node to hide some, but not all, of the children nodes of the at least one node;
    wherein a dialog box is associated with the at least one node in the tree diagram, and wherein the dialog box displays at least some of the at least one node's descendant nodes to facilitate obtaining the user input identifying the one or more nodes that are to be hidden.

2. A method for selectively displaying portions of a hierarchical data set on an electronic display, the method comprising:
    displaying at least a portion of the hierarchical data set on the electronic display in a tree diagram format;
    obtaining user input to identify one or more nodes in the tree diagram that are to be hidden; and
    partially collapsing at least one node in the tree diagram to hide the one or more identified nodes, wherein the partial collapse comprises collapsing the at least one node to hide some, but not all, of the children nodes of the at least one node;
    wherein a dialog box is associated with a first node in the tree diagram that displays at least some of the nodes in the tree diagram between the first node and a corresponding root node to facilitate obtaining the user input identifying the one or more nodes that are to be hidden.

3. A method for selectively displaying portions of a hierarchical data set on an electronic display, the method comprising;
    displaying at least a portion of the hierarchical data set on the electronic display in a tree diagram format;
    obtaining user input to identify one or more nodes in the tree diagram that are to be hidden; and
    partially collapsing at least one node in the tree diagram to hide the one or more identified nodes, wherein the partial collapse comprises collapsing the at least one node to hide some, but not all, of the children nodes of the at least one node;
    wherein obtaining user input identifying one or more nodes in the tree diagram that are to be hidden comprises having a user identify nodes that will remain displayed when an ancestor node is partially collapsed.

4. The method of claim 3, further comprising providing an indicia on the electronic display associated with each partially collapsed node that identifies the node as being a partially collapsed node.

5. The method of claim 4, wherein the indicia comprises an ellipsis.

6. The method of claim 5, wherein the ellipsis is located between the partially collapsed node and a first descendant node of the partially collapsed node that is displayed on the electronic display.

7. The method of claim 4, further comprising selecting the indicia.

8. The method of claim 7, wherein the selection of the indicia causes the node associated with the indicia to collapse.

9. The method of claim 3, wherein the electronic display is part of a handheld computing device.

10. The method of claim 3, wherein partially collapsing at least one node comprises collapsing at least one immediate descendant node of the at least one node into the at least one node without collapsing all the descendant nodes of the at least one node into the at least one node.

11. The method of claim 3, further comprising saving to a memory storage device the current configuration of nodes displayed on the electronic display.

12. The method of claim 11, wherein saving to a memory storage device the current configuration of nodes displayed on the electronic display comprises having a user associate a name with the current configuration and saving the current configuration and the associated name to the memory storage device.

13. A method for selectively displaying portions of a hierarchical data set on an electronic display, the method comprising:

displaying at least a portion of the hierarchical data set on the electronic display in a tree diagram format;

obtaining user input to identify one or more nodes in the tree diagram that are to be hidden;

partially collapsing at least one node in the tree diagram to hide the one or more identified nodes, wherein the partial collapse comprises collapsing the at least one node to hide some, but not all, of the children nodes of the at least one node;

providing an indicia on the electronic display associated with each partially collapsed node that identifies the node as being a partially collapsed node; and selecting the indicia;

wherein the selection of the indicia causes a dialog box to appear that displays at least two options for further collapsing or expanding the node associated with the indicia.

* * * * *